US012011920B2

(12) United States Patent
Landa et al.

(10) Patent No.: US 12,011,920 B2
(45) Date of Patent: Jun. 18, 2024

(54) PRINTING METHOD AND SYSTEM

(71) Applicant: LANDA CORPORATION LTD., Rehovot (IL)

(72) Inventors: Benzion Landa, Nes Ziona (IL); Zohar Goldenstein, Nes Ziona (IL); Tomer Schindler, Tel Aviv (IL); Ronen Lalezar, Rishon Lezion (IL)

(73) Assignee: LANDA CORPORATION LTD., Rehovot (IL)

( * ) Notice: Subject to any disclaimer, the term of this patent is extended or adjusted under 35 U.S.C. 154(b) by 98 days.

(21) Appl. No.: 17/788,335

(22) PCT Filed: Dec. 9, 2020

(86) PCT No.: PCT/IB2020/061673

§ 371 (c)(1),
(2) Date: Jun. 23, 2022

(87) PCT Pub. No.: WO2021/137063

PCT Pub. Date: Jul. 8, 2021

(65) Prior Publication Data

US 2023/0016492 A1 Jan. 19, 2023

Related U.S. Application Data

(60) Provisional application No. 62/954,516, filed on Dec. 29, 2019.

(51) Int. Cl.
*B41J 2/005* (2006.01)
*G03G 15/16* (2006.01)

(52) U.S. Cl.
CPC .......... *B41J 2/0057* (2013.01); *G03G 15/161* (2013.01)

(58) Field of Classification Search
CPC ..... B41J 2/0057; B41J 2002/012; B41J 29/17
See application file for complete search history.

(56) References Cited

U.S. PATENT DOCUMENTS 2,839,181 A 6/1958 Renner
3,011,545 A 12/1961 Welsh et al.
(Continued)

FOREIGN PATENT DOCUMENTS

CN 1121033 A 4/1996
CN 1200085 A 11/1998
(Continued)

OTHER PUBLICATIONS

CN107879147A Machine Translation (by EPO and Google)—published Apr. 6, 2018; Brother Ind Ltd.
(Continued)

*Primary Examiner* — Julian D Huffman
(74) *Attorney, Agent, or Firm* — KLIGLER & ASSOCIATES PATENT ATTORNEYS LTD.

(57) ABSTRACT

A method of printing includes, applying to an intermediate transfer member (ITM) (44), one or more fluids that include at least a printing fluid for forming an image on the ITM (44). At least part of the image is transferred from the ITM (44) to a target substrate (50). Residues of the one or more fluids that were not transferred to the target substrate (50) and remained on the ITM (44), are transferred from the ITM (44) to one or more rotatable elements (112), and the residues are removed from the one or more rotatable elements (112).

20 Claims, 3 Drawing Sheets

(56) References Cited

U.S. PATENT DOCUMENTS 3,053,319 A 9/1962 Cronin et al.
3,697,551 A 10/1972 Thomson
3,697,568 A 10/1972 Boissieras et al.
3,889,802 A 6/1975 Jonkers
3,898,670 A 8/1975 Erikson et al.
3,935,055 A 1/1976 Carmien
3,947,113 A 3/1976 Buchan et al.
4,009,958 A 3/1977 Kurita et al.
4,093,764 A 6/1978 Duckett et al.
4,204,471 A 5/1980 Becker
4,293,866 A 10/1981 Takita et al.
4,401,500 A 8/1983 Hamada et al.
4,520,048 A 5/1985 Ranger
4,535,694 A 8/1985 Fukuda
4,538,156 A 8/1985 Durkee et al.
4,555,437 A 11/1985 Tanck
4,575,465 A 3/1986 Viola
4,586,807 A 5/1986 Yuasa
4,642,654 A 2/1987 Toganoh et al.
4,792,473 A 12/1988 Vitale
4,853,737 A 8/1989 Hartley et al.
4,867,830 A 9/1989 Chung
4,976,197 A 12/1990 Yamanari et al.
5,012,072 A 4/1991 Martin et al.
5,039,339 A 8/1991 Phan et al.
5,062,364 A 11/1991 Lewis et al.
5,075,731 A 12/1991 Kamimura et al.
5,099,256 A 3/1992 Anderson
5,106,417 A 4/1992 Hauser et al.
5,128,091 A 7/1992 Agur et al.
5,190,582 A 3/1993 Shinozuka et al.
5,198,835 A 3/1993 Ando et al.
5,246,100 A 9/1993 Stone et al.
5,264,904 A 11/1993 Audi et al.
5,305,099 A 4/1994 Morcos
5,320,214 A 6/1994 Kordis
5,333,771 A 8/1994 Cesario
5,349,905 A 9/1994 Taylor et al.
5,352,507 A 10/1994 Bresson et al.
5,365,324 A 11/1994 Gu et al.
5,406,884 A 4/1995 Okuda et al.
5,471,233 A 11/1995 Okamoto et al.
5,532,314 A 7/1996 Sexsmith
5,552,875 A 9/1996 Sagiv et al.
5,575,873 A 11/1996 Pieper et al.
5,587,779 A 12/1996 Heeren et al.
5,608,004 A 3/1997 Toyoda et al.
5,613,669 A 3/1997 Grueninger
5,614,933 A 3/1997 Hindman et al.
5,623,296 A 4/1997 Fujino et al.
5,642,141 A 6/1997 Hale et al.
5,660,108 A 8/1997 Pensavecchia
5,677,719 A 10/1997 Granzow
5,679,463 A 10/1997 Visser et al.
5,683,841 A 11/1997 Kato
5,698,018 A 12/1997 Bishop et al.
5,723,242 A 3/1998 Woo et al.
5,733,698 A 3/1998 Lehman et al.
5,736,250 A 4/1998 Heeks et al.
5,757,390 A 5/1998 Gragg et al.
5,772,746 A 6/1998 Sawada et al.
5,777,576 A 7/1998 Zur et al.
5,777,650 A 7/1998 Blank
5,780,412 A 7/1998 Scarborough et al.
5,841,456 A 11/1998 Takei et al.
5,859,076 A 1/1999 Kozma et al.
5,865,299 A 2/1999 Williams
5,880,214 A 3/1999 Okuda
5,883,144 A 3/1999 Bambara et al.
5,883,145 A 3/1999 Hurley et al.
5,884,559 A 3/1999 Okubo et al.
5,889,534 A 3/1999 Johnson et al.
5,891,934 A 4/1999 Moffatt et al.
5,895,711 A 4/1999 Yamaki et al.
5,902,841 A 5/1999 Jaeger et al.
5,923,929 A 7/1999 Ben et al.
5,929,129 A 7/1999 Feichtinger
5,932,659 A 8/1999 Bambara et al.
5,935,751 A 8/1999 Matsuoka et al.
5,978,631 A 11/1999 Lee
5,978,638 A 11/1999 Tanaka et al.
5,991,590 A 11/1999 Chang et al.
6,004,647 A 12/1999 Bambara et al.
6,009,284 A 12/1999 Weinberger et al.
6,024,018 A 2/2000 Darel et al.
6,024,786 A 2/2000 Gore
6,033,049 A 3/2000 Fukuda
6,045,817 A 4/2000 Ananthapadmanabhan et al.
6,053,438 A 4/2000 Romano, Jr. et al.
6,055,396 A 4/2000 Pang
6,059,407 A 5/2000 Komatsu et al.
6,071,368 A 6/2000 Boyd et al.
6,072,976 A 6/2000 Kuriyama et al.
6,078,775 A 6/2000 Arai et al.
6,094,558 A 7/2000 Shimizu et al.
6,102,538 A 8/2000 Ochi et al.
6,103,775 A 8/2000 Bambara et al.
6,108,513 A 8/2000 Landa et al.
6,109,746 A 8/2000 Jeanmaire et al.
6,132,541 A 10/2000 Heaton
6,143,807 A 11/2000 Lin et al.
6,166,105 A 12/2000 Santilli et al.
6,195,112 B1 2/2001 Fassler et al.
6,196,674 B1 3/2001 Takemoto
6,213,580 B1 4/2001 Segerstrom et al.
6,214,894 B1 4/2001 Bambara et al.
6,221,928 B1 4/2001 Kozma et al.
6,234,625 B1 5/2001 Wen
6,242,503 B1 6/2001 Kozma et al.
6,257,716 B1 7/2001 Yanagawa et al.
6,261,688 B1 7/2001 Kaplan et al.
6,262,137 B1 7/2001 Kozma et al.
6,262,207 B1 7/2001 Rao et al.
6,303,215 B1 10/2001 Sonobe et al.
6,316,512 B1 11/2001 Bambara et al.
6,318,853 B1 11/2001 Asano et al.
6,332,943 B1 12/2001 Herrmann et al.
6,335,046 B1 1/2002 Mackey
6,354,700 B1 3/2002 Roth
6,357,869 B1 3/2002 Rasmussen et al.
6,357,870 B1 3/2002 Beach et al.
6,358,660 B1 3/2002 Agler et al.
6,363,234 B2 3/2002 Landa et al.
6,364,451 B1 4/2002 Silverbrook
6,377,772 B1 4/2002 Chowdry et al.
6,383,278 B1 5/2002 Hirasa et al.
6,386,697 B1 5/2002 Yamamoto et al.
6,390,617 B1 5/2002 Iwao
6,396,528 B1 5/2002 Yanagawa
6,397,034 B1 5/2002 Tarnawskyj et al.
6,400,913 B1 6/2002 De et al.
6,402,317 B2 6/2002 Yanagawa et al.
6,405,006 B1 6/2002 Tabuchi
6,409,331 B1 6/2002 Gelbart
6,432,501 B1 8/2002 Yang et al.
6,438,352 B1 8/2002 Landa et al.
6,454,378 B1 9/2002 Silverbrook et al.
6,471,803 B1 10/2002 Pelland et al.
6,530,321 B2 3/2003 Andrew et al.
6,530,657 B2 3/2003 Polierer
6,531,520 B1 3/2003 Bambara et al.
6,551,394 B2 4/2003 Hirasa et al.
6,551,716 B1 4/2003 Landa et al.
6,554,189 B1 4/2003 Good et al.
6,559,969 B1 5/2003 Lapstun
6,575,547 B2 6/2003 Sakuma
6,586,100 B1 7/2003 Pickering et al.
6,590,012 B2 7/2003 Miyabayashi
6,608,979 B1 8/2003 Landa et al.
6,623,817 B1 9/2003 Yang et al.
6,630,047 B2 10/2003 Jing et al.
6,633,735 B2 10/2003 Kellie et al.
6,639,527 B2 10/2003 Johnson
6,648,468 B2 11/2003 Shinkoda et al.

(56) References Cited

U.S. PATENT DOCUMENTS

| | | | |
|---|---|---|---|
| 6,678,068 | B1 | 1/2004 | Richter et al. |
| 6,682,189 | B2 | 1/2004 | May et al. |
| 6,685,769 | B1 | 2/2004 | Karl et al. |
| 6,704,535 | B2 | 3/2004 | Kobayashi et al. |
| 6,709,096 | B1 | 3/2004 | Beach et al. |
| 6,716,562 | B2 | 4/2004 | Uehara et al. |
| 6,719,423 | B2 | 4/2004 | Chowdry et al. |
| 6,720,367 | B2 | 4/2004 | Taniguchi et al. |
| 6,755,519 | B2 | 6/2004 | Gelbart et al. |
| 6,761,446 | B2 | 7/2004 | Chowdry et al. |
| 6,770,331 | B1 | 8/2004 | Mielke et al. |
| 6,789,887 | B2 | 9/2004 | Yang et al. |
| 6,811,840 | B1 | 11/2004 | Cross |
| 6,827,018 | B1 | 12/2004 | Hartmann et al. |
| 6,881,458 | B2 | 4/2005 | Ludwig et al. |
| 6,898,403 | B2 | 5/2005 | Baker et al. |
| 6,912,952 | B1 | 7/2005 | Landa et al. |
| 6,916,862 | B2 | 7/2005 | Ota et al. |
| 6,917,437 | B1 | 7/2005 | Myers et al. |
| 6,966,712 | B2 | 11/2005 | Trelewicz et al. |
| 6,970,674 | B2 | 11/2005 | Sato et al. |
| 6,974,022 | B2 | 12/2005 | Saeki |
| 6,982,799 | B2 | 1/2006 | Lapstun |
| 6,983,692 | B2 | 1/2006 | Beauchamp et al. |
| 7,025,453 | B2 | 4/2006 | Ylitalo et al. |
| 7,057,760 | B2 | 6/2006 | Lapstun et al. |
| 7,084,202 | B2 | 8/2006 | Pickering et al. |
| 7,128,412 | B2 | 10/2006 | King et al. |
| 7,129,858 | B2 | 10/2006 | Ferran et al. |
| 7,134,953 | B2 | 11/2006 | Reinke |
| 7,160,377 | B2 | 1/2007 | Zoch et al. |
| 7,204,584 | B2 | 4/2007 | Lean et al. |
| 7,213,900 | B2 | 5/2007 | Ebihara |
| 7,224,478 | B1 | 5/2007 | Lapstun et al. |
| 7,265,819 | B2 | 9/2007 | Raney |
| 7,271,213 | B2 | 9/2007 | Hoshida et al. |
| 7,296,882 | B2 | 11/2007 | Buehler et al. |
| 7,300,133 | B1 | 11/2007 | Folkins et al. |
| 7,300,147 | B2 | 11/2007 | Johnson |
| 7,304,753 | B1 | 12/2007 | Richter et al. |
| 7,322,689 | B2 | 1/2008 | Kohne et al. |
| 7,334,520 | B2 | 2/2008 | Geissler et al. |
| 7,348,368 | B2 | 3/2008 | Kakiuchi et al. |
| 7,360,887 | B2 | 4/2008 | Konno |
| 7,362,464 | B2 | 4/2008 | Kitazawa |
| 7,459,491 | B2 | 12/2008 | Tyvoll et al. |
| 7,494,213 | B2 | 2/2009 | Taniuchi et al. |
| 7,527,359 | B2 | 5/2009 | Stevenson et al. |
| 7,575,314 | B2 | 8/2009 | Desie et al. |
| 7,612,125 | B2 | 11/2009 | Muller et al. |
| 7,655,707 | B2 | 2/2010 | Ma |
| 7,655,708 | B2 | 2/2010 | House et al. |
| 7,699,922 | B2 | 4/2010 | Breton et al. |
| 7,708,371 | B2 | 5/2010 | Yamanobe |
| 7,709,074 | B2 | 5/2010 | Uchida et al. |
| 7,712,890 | B2 | 5/2010 | Yahiro |
| 7,732,543 | B2 | 6/2010 | Loch et al. |
| 7,732,583 | B2 | 6/2010 | Annoura et al. |
| 7,808,670 | B2 | 10/2010 | Lapstun et al. |
| 7,810,922 | B2 | 10/2010 | Gervasi et al. |
| 7,845,788 | B2 | 12/2010 | Oku |
| 7,867,327 | B2 | 1/2011 | Sano et al. |
| 7,876,345 | B2 | 1/2011 | Houjou |
| 7,910,183 | B2 | 3/2011 | Wu |
| 7,919,544 | B2 | 4/2011 | Matsuyama et al. |
| 7,942,516 | B2 | 5/2011 | Ohara et al. |
| 7,977,408 | B2 | 7/2011 | Matsuyama et al. |
| 7,985,784 | B2 | 7/2011 | Kanaya et al. |
| 8,002,400 | B2 | 8/2011 | Kibayashi et al. |
| 8,012,538 | B2 | 9/2011 | Yokouchi |
| 8,025,389 | B2 | 9/2011 | Yamanobe et al. |
| 8,038,284 | B2 | 10/2011 | Hori et al. |
| 8,041,275 | B2 | 10/2011 | Soria et al. |
| 8,042,906 | B2 | 10/2011 | Chiwata et al. |
| 8,059,309 | B2 | 11/2011 | Lapstun et al. |
| 8,095,054 | B2 | 1/2012 | Nakamura |
| 8,109,595 | B2 | 2/2012 | Tanaka et al. |
| 8,119,315 | B1 | 2/2012 | Heuft et al. |
| 8,122,846 | B2 | 2/2012 | Stiblert et al. |
| 8,147,055 | B2 | 4/2012 | Cellura et al. |
| 8,162,428 | B2 | 4/2012 | Eun et al. |
| 8,177,351 | B2 | 5/2012 | Taniuchi et al. |
| 8,186,820 | B2 | 5/2012 | Chiwata |
| 8,192,904 | B2 | 6/2012 | Nagai et al. |
| 8,215,762 | B2 | 7/2012 | Ageishi |
| 8,242,201 | B2 | 8/2012 | Goto et al. |
| 8,256,857 | B2 | 9/2012 | Folkins et al. |
| 8,263,683 | B2 | 9/2012 | Gibson et al. |
| 8,264,135 | B2 | 9/2012 | Ozolins et al. |
| 8,295,733 | B2 | 10/2012 | Imoto |
| 8,303,071 | B2 | 11/2012 | Eun |
| 8,303,072 | B2 | 11/2012 | Shibata et al. |
| 8,304,043 | B2 | 11/2012 | Nagashima et al. |
| 8,353,589 | B2 | 1/2013 | Ikeda et al. |
| 8,434,847 | B2 | 5/2013 | Dejong et al. |
| 8,460,450 | B2 | 6/2013 | Taverizatshy et al. |
| 8,469,476 | B2 | 6/2013 | Mandel et al. |
| 8,474,963 | B2 | 7/2013 | Hasegawa et al. |
| 8,536,268 | B2 | 9/2013 | Karjala et al. |
| 8,546,466 | B2 | 10/2013 | Yamashita et al. |
| 8,556,400 | B2 | 10/2013 | Yatake et al. |
| 8,693,032 | B2 | 4/2014 | Goddard et al. |
| 8,711,304 | B2 | 4/2014 | Mathew et al. |
| 8,714,731 | B2 | 5/2014 | Leung et al. |
| 8,746,873 | B2 | 6/2014 | Tsukamoto et al. |
| 8,779,027 | B2 | 7/2014 | Idemura et al. |
| 8,802,221 | B2 | 8/2014 | Noguchi et al. |
| 8,867,097 | B2 | 10/2014 | Mizuno |
| 8,885,218 | B2 | 11/2014 | Hirose |
| 8,891,128 | B2 | 11/2014 | Yamazaki |
| 8,894,198 | B2 | 11/2014 | Hook et al. |
| 8,919,946 | B2 | 12/2014 | Suzuki et al. |
| 9,004,629 | B2 | 4/2015 | De et al. |
| 9,186,884 | B2 | 11/2015 | Landa et al. |
| 9,207,585 | B2 | 12/2015 | Hatano et al. |
| 9,227,429 | B1 | 1/2016 | LeStrange et al. |
| 9,229,664 | B2 | 1/2016 | Landa et al. |
| 9,264,559 | B2 | 2/2016 | Motoyanagi et al. |
| 9,284,469 | B2 | 3/2016 | Song et al. |
| 9,290,016 | B2 | 3/2016 | Landa et al. |
| 9,327,496 | B2 | 5/2016 | Landa et al. |
| 9,327,519 | B1 | 5/2016 | Larson et al. |
| 9,353,273 | B2 | 5/2016 | Landa et al. |
| 9,381,736 | B2 | 7/2016 | Landa et al. |
| 9,446,586 | B2 | 9/2016 | Matos et al. |
| 9,498,946 | B2 | 11/2016 | Landa et al. |
| 9,505,208 | B2 | 11/2016 | Shmaiser et al. |
| 9,517,618 | B2 | 12/2016 | Landa et al. |
| 9,566,780 | B2 | 2/2017 | Landa et al. |
| 9,568,862 | B2 | 2/2017 | Shmaiser et al. |
| 9,643,400 | B2 | 5/2017 | Landa et al. |
| 9,643,403 | B2 | 5/2017 | Landa et al. |
| 9,776,391 | B2 | 10/2017 | Landa et al. |
| 9,782,993 | B2 | 10/2017 | Landa et al. |
| 9,849,667 | B2 | 12/2017 | Landa et al. |
| 9,884,479 | B2 | 2/2018 | Landa et al. |
| 9,902,147 | B2 | 2/2018 | Shmaiser et al. |
| 9,914,316 | B2 | 3/2018 | Landa et al. |
| 10,065,411 | B2 | 9/2018 | Landa et al. |
| 10,175,613 | B2 | 1/2019 | Watanabe |
| 10,179,447 | B2 | 1/2019 | Shmaiser et al. |
| 10,190,012 | B2 | 1/2019 | Landa et al. |
| 10,195,843 | B2 | 2/2019 | Landa et al. |
| 10,201,968 | B2 | 2/2019 | Landa et al. |
| 10,226,920 | B2 | 3/2019 | Shmaiser et al. |
| 10,266,711 | B2 | 4/2019 | Landa et al. |
| 10,300,690 | B2 | 5/2019 | Landa et al. |
| 10,357,963 | B2 | 7/2019 | Landa et al. |
| 10,357,985 | B2 | 7/2019 | Landa et al. |
| 10,427,399 | B2 | 10/2019 | Shmaiser et al. |
| 10,434,761 | B2 | 10/2019 | Landa et al. |
| 10,477,188 | B2 | 11/2019 | Stiglic et al. |
| 10,518,526 | B2 | 12/2019 | Landa et al. |
| 10,569,532 | B2 | 2/2020 | Shmaiser et al. |

(56) References Cited

U.S. PATENT DOCUMENTS

| | | | |
|---|---|---|---|
| 10,569,533 | B2 | 2/2020 | Landa et al. |
| 10,569,534 | B2 | 2/2020 | Shmaiser et al. |
| 10,576,734 | B2 | 3/2020 | Landa et al. |
| 10,596,804 | B2 | 3/2020 | Landa et al. |
| 10,632,740 | B2 | 4/2020 | Landa et al. |
| 10,642,198 | B2 | 5/2020 | Landa et al. |
| 10,703,094 | B2 | 7/2020 | Shmaiser et al. |
| 10,730,333 | B2 | 8/2020 | Landa et al. |
| 10,759,953 | B2 | 9/2020 | Landa et al. |
| 10,800,936 | B2 | 10/2020 | Landa et al. |
| 10,828,888 | B2 | 11/2020 | Landa et al. |
| 10,884,349 | B2 | 1/2021 | Landa et al. |
| 10,889,128 | B2 | 1/2021 | Landa et al. |
| 10,926,532 | B2 | 2/2021 | Chechik et al. |
| 10,933,661 | B2 | 3/2021 | Landa et al. |
| 10,960,660 | B2 | 3/2021 | Landa et al. |
| 10,981,377 | B2 | 4/2021 | Landa et al. |
| 10,994,528 | B1 | 5/2021 | Burkatovsky |
| 11,104,123 | B2 | 8/2021 | Shmaiser et al. |
| 11,106,161 | B2 | 8/2021 | Landa et al. |
| 11,179,928 | B2 | 11/2021 | Shmaiser et al. |
| 11,196,984 | B2 | 12/2021 | Stiglic et al. |
| 11,203,199 | B2 | 12/2021 | Landa et al. |
| 11,214,089 | B2 | 1/2022 | Landa et al. |
| 11,235,568 | B2 | 2/2022 | Landa et al. |
| 11,267,239 | B2 | 3/2022 | Pomerantz et al. |
| 11,285,715 | B2 | 3/2022 | Landa et al. |
| 11,318,734 | B2 | 5/2022 | Chechik et al. |
| 11,321,028 | B2 | 5/2022 | Levant |
| 11,327,413 | B2 | 5/2022 | Landa et al. |
| 11,396,190 | B2 | 7/2022 | Landa et al. |
| 11,465,426 | B2 | 10/2022 | Landa et al. |
| 2001/0022607 | A1 | 9/2001 | Takahashi et al. |
| 2001/0033688 | A1 | 10/2001 | Taylor |
| 2002/0041317 | A1 | 4/2002 | Kashiwazaki et al. |
| 2002/0061451 | A1 | 5/2002 | Kita et al. |
| 2002/0064404 | A1 | 5/2002 | Iwai |
| 2002/0102374 | A1 | 8/2002 | Gervasi et al. |
| 2002/0121220 | A1 | 9/2002 | Lin |
| 2002/0150408 | A1 | 10/2002 | Mosher et al. |
| 2002/0164494 | A1 | 11/2002 | Grant et al. |
| 2002/0197481 | A1 | 12/2002 | Jing et al. |
| 2003/0004025 | A1 | 1/2003 | Okuno et al. |
| 2003/0007055 | A1 | 1/2003 | Ogawa |
| 2003/0018119 | A1 | 1/2003 | Frenkel et al. |
| 2003/0030686 | A1 | 2/2003 | Abe et al. |
| 2003/0032700 | A1 | 2/2003 | Morrison et al. |
| 2003/0041777 | A1 | 3/2003 | Karl et al. |
| 2003/0043258 | A1 | 3/2003 | Kerr et al. |
| 2003/0054139 | A1 | 3/2003 | Ylitalo et al. |
| 2003/0055129 | A1 | 3/2003 | Alford |
| 2003/0063179 | A1 | 4/2003 | Adachi |
| 2003/0064317 | A1 | 4/2003 | Bailey et al. |
| 2003/0081964 | A1 | 5/2003 | Shimura et al. |
| 2003/0103128 | A1 | 6/2003 | Missell et al. |
| 2003/0118381 | A1 | 6/2003 | Law et al. |
| 2003/0129435 | A1 | 7/2003 | Blankenship et al. |
| 2003/0186147 | A1 | 10/2003 | Pickering et al. |
| 2003/0214568 | A1 | 11/2003 | Nishikawa et al. |
| 2003/0234849 | A1 | 12/2003 | Pan et al. |
| 2004/0003863 | A1 | 1/2004 | Eckhardt |
| 2004/0020382 | A1 | 2/2004 | McLean et al. |
| 2004/0036758 | A1 | 2/2004 | Sasaki et al. |
| 2004/0047666 | A1 | 3/2004 | Imaizumi et al. |
| 2004/0087707 | A1 | 5/2004 | Zoch et al. |
| 2004/0123761 | A1 | 7/2004 | Szumla et al. |
| 2004/0125188 | A1 | 7/2004 | Szumla et al. |
| 2004/0145643 | A1 | 7/2004 | Nakamura |
| 2004/0173111 | A1 | 9/2004 | Okuda |
| 2004/0177779 | A1 | 9/2004 | Steffen et al. |
| 2004/0200369 | A1 | 10/2004 | Brady |
| 2004/0221943 | A1 | 11/2004 | Yu et al. |
| 2004/0228642 | A1 | 11/2004 | Iida et al. |
| 2004/0246324 | A1 | 12/2004 | Nakashima |
| 2004/0246326 | A1 | 12/2004 | Dwyer et al. |
| 2004/0249327 | A1 | 12/2004 | Sendijarevic et al. |
| 2004/0252175 | A1 | 12/2004 | Bejat et al. |
| 2004/0265016 | A1 | 12/2004 | Kitani et al. |
| 2005/0031807 | A1 | 2/2005 | Quintens et al. |
| 2005/0082146 | A1 | 4/2005 | Axmann |
| 2005/0103437 | A1 | 5/2005 | Carroll |
| 2005/0110855 | A1 | 5/2005 | Taniuchi et al. |
| 2005/0111861 | A1 | 5/2005 | Calamita et al. |
| 2005/0117859 | A1 | 6/2005 | Suzuki et al. |
| 2005/0134874 | A1 | 6/2005 | Overall et al. |
| 2005/0150408 | A1 | 7/2005 | Hesterman |
| 2005/0185009 | A1 | 8/2005 | Claramunt et al. |
| 2005/0195235 | A1 | 9/2005 | Kitao |
| 2005/0235870 | A1 | 10/2005 | Ishihara |
| 2005/0266332 | A1 | 12/2005 | Pavlisko et al. |
| 2005/0272334 | A1 | 12/2005 | Wang et al. |
| 2006/0004123 | A1 | 1/2006 | Wu et al. |
| 2006/0066704 | A1 | 3/2006 | Nishida |
| 2006/0120740 | A1 | 6/2006 | Yamada et al. |
| 2006/0135709 | A1 | 6/2006 | Hasegawa et al. |
| 2006/0164489 | A1 | 7/2006 | Vega et al. |
| 2006/0192827 | A1 | 8/2006 | Takada et al. |
| 2006/0233578 | A1 | 10/2006 | Maki et al. |
| 2006/0286462 | A1 | 12/2006 | Jackson et al. |
| 2007/0014595 | A1 | 1/2007 | Kawagoe |
| 2007/0025740 | A1 | 2/2007 | Katoh et al. |
| 2007/0025768 | A1 | 2/2007 | Komatsu et al. |
| 2007/0029171 | A1 | 2/2007 | Nemedi |
| 2007/0045939 | A1 | 3/2007 | Toya et al. |
| 2007/0054981 | A1 | 3/2007 | Yanagi et al. |
| 2007/0064077 | A1 | 3/2007 | Konno |
| 2007/0077520 | A1 | 4/2007 | Maemoto |
| 2007/0120927 | A1 | 5/2007 | Snyder et al. |
| 2007/0123642 | A1 | 5/2007 | Banning et al. |
| 2007/0134030 | A1 | 6/2007 | Lior et al. |
| 2007/0144368 | A1 | 6/2007 | Barazani et al. |
| 2007/0146462 | A1 | 6/2007 | Taniuchi et al. |
| 2007/0147894 | A1 | 6/2007 | Yokota et al. |
| 2007/0166071 | A1 | 7/2007 | Shima |
| 2007/0176995 | A1 | 8/2007 | Kadomatsu et al. |
| 2007/0189819 | A1 | 8/2007 | Uehara et al. |
| 2007/0199457 | A1 | 8/2007 | Cyman et al. |
| 2007/0229639 | A1 | 10/2007 | Yahiro |
| 2007/0253726 | A1 | 11/2007 | Kagawa |
| 2007/0257955 | A1 | 11/2007 | Tanaka et al. |
| 2007/0285486 | A1 | 12/2007 | Harris et al. |
| 2008/0006176 | A1 | 1/2008 | Houjou |
| 2008/0030536 | A1 | 2/2008 | Furukawa et al. |
| 2008/0032072 | A1 | 2/2008 | Taniuchi et al. |
| 2008/0044587 | A1 | 2/2008 | Maeno et al. |
| 2008/0055356 | A1 | 3/2008 | Yamanobe |
| 2008/0055381 | A1 | 3/2008 | Doi et al. |
| 2008/0066277 | A1 | 3/2008 | Colson et al. |
| 2008/0074462 | A1 | 3/2008 | Hirakawa |
| 2008/0112912 | A1 | 5/2008 | Springob et al. |
| 2008/0124158 | A1 | 5/2008 | Folkins |
| 2008/0138546 | A1 | 6/2008 | Soria et al. |
| 2008/0166495 | A1 | 7/2008 | Maeno et al. |
| 2008/0167185 | A1 | 7/2008 | Hirota |
| 2008/0175612 | A1 | 7/2008 | Oikawa et al. |
| 2008/0196612 | A1 | 8/2008 | Rancourt et al. |
| 2008/0196621 | A1 | 8/2008 | Ikuno et al. |
| 2008/0213548 | A1 | 9/2008 | Koganehira et al. |
| 2008/0236480 | A1 | 10/2008 | Furukawa et al. |
| 2008/0247780 | A1 | 10/2008 | Hara |
| 2008/0253812 | A1 | 10/2008 | Pearce et al. |
| 2009/0022504 | A1 | 1/2009 | Kuwabara et al. |
| 2009/0041515 | A1 | 2/2009 | Kim |
| 2009/0041932 | A1 | 2/2009 | Ishizuka et al. |
| 2009/0064884 | A1 | 3/2009 | Hook et al. |
| 2009/0073222 | A1 * | 3/2009 | Hori ........................ B41J 29/17 347/33 |
| 2009/0074492 | A1 | 3/2009 | Ito |
| 2009/0082503 | A1 | 3/2009 | Yanagi et al. |
| 2009/0087565 | A1 | 4/2009 | Houjou |
| 2009/0098385 | A1 | 4/2009 | Kaemper et al. |
| 2009/0116885 | A1 | 5/2009 | Ando |
| 2009/0148200 | A1 | 6/2009 | Hara et al. |
| 2009/0165937 | A1 | 7/2009 | Inoue et al. |

(56) References Cited

U.S. PATENT DOCUMENTS

2009/0185204 A1 7/2009 Wu et al.
2009/0190951 A1 7/2009 Torimaru et al.
2009/0202275 A1 8/2009 Nishida et al.
2009/0211490 A1 8/2009 Ikuno et al.
2009/0220873 A1 9/2009 Enomoto et al.
2009/0237479 A1 9/2009 Yamashita et al.
2009/0256896 A1 10/2009 Scarlata
2009/0279170 A1 11/2009 Miyazaki et al.
2009/0315926 A1 12/2009 Yamanobe
2009/0317555 A1 12/2009 Hori
2009/0318591 A1 12/2009 Ageishi et al.
2010/0012023 A1 1/2010 Lefevre et al.
2010/0035501 A1 2/2010 Prudhomme et al.
2010/0053292 A1 3/2010 Thayer et al.
2010/0053293 A1 3/2010 Thayer et al.
2010/0066796 A1 3/2010 Yanagi et al.
2010/0075843 A1 3/2010 Ikuno et al.
2010/0086692 A1 4/2010 Ohta et al.
2010/0091064 A1 4/2010 Araki et al.
2010/0123752 A1 5/2010 Eun et al.
2010/0225695 A1 9/2010 Fujikura
2010/0231623 A1 9/2010 Hirato
2010/0239789 A1 9/2010 Umeda
2010/0245511 A1 9/2010 Ageishi
2010/0247171 A1 9/2010 Ono et al.
2010/0282100 A1 11/2010 Okuda et al.
2010/0285221 A1 11/2010 Oki et al.
2010/0300604 A1 12/2010 Goss et al.
2010/0303504 A1 12/2010 Funamoto et al.
2010/0310281 A1 12/2010 Miura et al.
2011/0044724 A1 2/2011 Funamoto et al.
2011/0058001 A1 3/2011 Gila et al.
2011/0058859 A1 3/2011 Nakamatsu et al.
2011/0069110 A1 3/2011 Matsumoto et al.
2011/0069117 A1 3/2011 Ohzeki et al.
2011/0069129 A1 3/2011 Shimizu
2011/0085828 A1 4/2011 Kosako et al.
2011/0128300 A1 6/2011 Gay et al.
2011/0141188 A1 6/2011 Morita
2011/0149002 A1 6/2011 Kessler
2011/0150509 A1 6/2011 Komiya
2011/0150541 A1 6/2011 Michibata
2011/0169889 A1 7/2011 Kojima et al.
2011/0195260 A1 8/2011 Lee et al.
2011/0199414 A1 8/2011 Lang
2011/0234683 A1 9/2011 Komatsu
2011/0234689 A1 9/2011 Saito
2011/0242181 A1 10/2011 Otobe
2011/0249090 A1 10/2011 Moore et al.
2011/0269885 A1 11/2011 Imai
2011/0279554 A1 11/2011 Dannhauser et al.
2011/0298884 A1 12/2011 Furuta
2011/0304674 A1 12/2011 Sambhy et al.
2012/0013693 A1 1/2012 Tasaka et al.
2012/0013694 A1 1/2012 Kanke
2012/0013928 A1 1/2012 Yoshida et al.
2012/0014726 A1 1/2012 Sekihara et al.
2012/0026224 A1 2/2012 Anthony et al.
2012/0039647 A1 2/2012 Brewington et al.
2012/0094091 A1 4/2012 Van et al.
2012/0098882 A1 4/2012 Onishi et al.
2012/0105561 A1 5/2012 Taniuchi et al.
2012/0105562 A1 5/2012 Sekiguchi et al.
2012/0113180 A1 5/2012 Tanaka et al.
2012/0113203 A1 5/2012 Kushida et al.
2012/0127250 A1 5/2012 Kanasugi et al.
2012/0127251 A1 5/2012 Tsuji et al.
2012/0140009 A1 6/2012 Kanasugi et al.
2012/0154497 A1 6/2012 Nakao et al.
2012/0156375 A1 6/2012 Brust et al.
2012/0156624 A1 6/2012 Rondon et al.
2012/0162302 A1 6/2012 Oguchi et al.
2012/0163846 A1 6/2012 Andoh et al.
2012/0194830 A1 8/2012 Gaertner et al.
2012/0236100 A1 9/2012 Toya
2012/0237260 A1 9/2012 Sengoku et al.
2012/0249630 A1 10/2012 Bugner et al.
2012/0287260 A1 11/2012 Lu et al.
2012/0301186 A1 11/2012 Yang et al.
2012/0314013 A1 12/2012 Takemoto et al.
2012/0314077 A1 12/2012 Clavenna et al.
2013/0011158 A1 1/2013 Meguro et al.
2013/0017006 A1 1/2013 Suda
2013/0044188 A1 2/2013 Nakamura et al.
2013/0057603 A1 3/2013 Gordon
2013/0088543 A1 4/2013 Tsuji et al.
2013/0096871 A1 4/2013 Takahama
2013/0120513 A1 5/2013 Thayer et al.
2013/0182045 A1 7/2013 Ohzeki et al.
2013/0201237 A1 8/2013 Thomson et al.
2013/0234080 A1 9/2013 Torikoshi et al.
2013/0235139 A1 9/2013 Schnabel et al.
2013/0242016 A1 9/2013 Edwards et al.
2013/0302065 A1 11/2013 Mori et al.
2013/0338273 A1 12/2013 Shimanaka et al.
2014/0001013 A1 1/2014 Takifuji et al.
2014/0011125 A1 1/2014 Inoue et al.
2014/0043398 A1 2/2014 Butler et al.
2014/0104360 A1 4/2014 Häcker et al.
2014/0153956 A1 6/2014 Yonemoto
2014/0168330 A1 6/2014 Liu et al.
2014/0175707 A1 6/2014 Wolk et al.
2014/0198162 A1 7/2014 DiRubio et al.
2014/0232782 A1 8/2014 Mukai et al.
2014/0267777 A1 9/2014 Le et al.
2014/0334855 A1 11/2014 Onishi et al.
2014/0339056 A1 11/2014 Iwakoshi et al.
2015/0022605 A1 1/2015 Mantell et al.
2015/0024648 A1 1/2015 Landa et al.
2015/0025179 A1 1/2015 Landa et al.
2015/0072090 A1 3/2015 Landa et al.
2015/0085036 A1 3/2015 Liu et al.
2015/0085037 A1 3/2015 Liu et al.
2015/0085038 A1 3/2015 Liu
2015/0116408 A1 4/2015 Armbruster et al.
2015/0118503 A1 4/2015 Landa et al.
2015/0165758 A1 6/2015 Sambhy et al.
2015/0195509 A1 7/2015 Phipps
2015/0210065 A1 7/2015 Kelly et al.
2015/0304531 A1 10/2015 Rodriguez et al.
2015/0315403 A1 11/2015 Song et al.
2015/0336378 A1 11/2015 Guttmann et al.
2015/0343797 A1 12/2015 Song et al.
2015/0361288 A1 12/2015 Song et al.
2016/0031246 A1 2/2016 Sreekumar et al.
2016/0083609 A1 3/2016 Sisler et al.
2016/0222232 A1 8/2016 Landa et al.
2016/0250879 A1 9/2016 Chen et al.
2016/0286462 A1 9/2016 Gohite et al.
2016/0375680 A1 12/2016 Nishitani et al.
2016/0378036 A1 12/2016 Onishi et al.
2017/0028688 A1 2/2017 Dannhauser et al.
2017/0104887 A1 4/2017 Nomura
2018/0149998 A1 5/2018 Furukawa
2018/0259888 A1 9/2018 Mitsui et al.
2018/0348672 A1 12/2018 Yoshida
2018/0348675 A1 12/2018 Nakamura et al.
2019/0016114 A1 1/2019 Sugiyama et al.
2019/0152218 A1 5/2019 Stein et al.
2019/0218411 A1 7/2019 Landa et al.
2020/0171813 A1 6/2020 Chechik et al.
2020/0361202 A1 11/2020 Burkatovsky
2021/0001622 A1 1/2021 Landa et al.
2021/0055666 A1 2/2021 Landa et al.
2021/0062021 A1 3/2021 Landa et al.
2021/0070083 A1 3/2021 Levanon et al.
2021/0095145 A1 4/2021 Landa et al.
2021/0260869 A1 8/2021 Landa et al.
2021/0268793 A1 9/2021 Burkatovsky
2021/0283899 A1 9/2021 Landa et al.
2021/0309020 A1 10/2021 Siman Tov et al.
2022/0016880 A1 1/2022 Landa et al.
2022/0016881 A1 1/2022 Shmaiser et al.
2022/0057732 A1 2/2022 Landa et al.

(56) References Cited

U.S. PATENT DOCUMENTS

| | | | |
|---|---|---|---|
| 2022/0111633 | A1 | 4/2022 | Shmaiser et al. |
| 2022/0119659 | A1 | 4/2022 | Landa et al. |
| 2022/0153015 | A1 | 5/2022 | Landa et al. |
| 2022/0153048 | A1 | 5/2022 | Landa et al. |
| 2022/0176693 | A1 | 6/2022 | Landa et al. |
| 2022/0188050 | A1 | 6/2022 | Levant |
| 2022/0250376 | A1 | 8/2022 | Pomerantz et al. |
| 2022/0274394 | A1 | 9/2022 | Chechik et al. |
| 2022/0274411 | A1 | 9/2022 | Chechik et al. |
| 2022/0288947 | A1 | 9/2022 | Landa et al. |
| 2023/0001710 | A1 | 1/2023 | Landa et al. |
| 2023/0037462 | A1 | 2/2023 | Burkatovsky |

FOREIGN PATENT DOCUMENTS

| | | | | |
|---|---|---|---|---|
| CN | 1212229 | A | 3/1999 | |
| CN | 1305895 | A | 8/2001 | |
| CN | 1324901 | A | 12/2001 | |
| CN | 1445622 | A | 10/2003 | |
| CN | 1493514 | A | 5/2004 | |
| CN | 1535235 | A | 10/2004 | |
| CN | 1543404 | A | 11/2004 | |
| CN | 1555422 | A | 12/2004 | |
| CN | 1680506 | A | 10/2005 | |
| CN | 1703326 | A | 11/2005 | |
| CN | 1720187 | A | 1/2006 | |
| CN | 1261831 | C | 6/2006 | |
| CN | 1809460 | A | 7/2006 | |
| CN | 1289368 | C | 12/2006 | |
| CN | 1961015 | A | 5/2007 | |
| CN | 101073937 | A | 11/2007 | |
| CN | 101096455 | A | 1/2008 | |
| CN | 101177057 | A | 5/2008 | |
| CN | 101248146 | A | 8/2008 | |
| CN | 101249768 | A | 8/2008 | |
| CN | 101344746 | A | 1/2009 | |
| CN | 101359210 | A | 2/2009 | |
| CN | 101396910 | A | 4/2009 | |
| CN | 101508200 | A | 8/2009 | |
| CN | 101519007 | A | 9/2009 | |
| CN | 101524916 | A | 9/2009 | |
| CN | 101544100 | A | 9/2009 | |
| CN | 101544101 | A | 9/2009 | |
| CN | 101592896 | A | 12/2009 | |
| CN | 101607468 | A | 12/2009 | |
| CN | 201410787 | Y | 2/2010 | |
| CN | 101820241 | A | 9/2010 | |
| CN | 101835611 | A | 9/2010 | |
| CN | 101835612 | A | 9/2010 | |
| CN | 101873982 | A | 10/2010 | |
| CN | 102229294 | A | 11/2011 | |
| CN | 102248776 | A | 11/2011 | |
| CN | 102300932 | A | 12/2011 | |
| CN | 102341249 | A | 2/2012 | |
| CN | 102529257 | A | 7/2012 | |
| CN | 102648095 | A | 8/2012 | |
| CN | 102673209 | A | 9/2012 | |
| CN | 102925002 | A | 2/2013 | |
| CN | 103045008 | A | 4/2013 | |
| CN | 103309213 | A | 9/2013 | |
| CN | 103568483 | A | 2/2014 | |
| CN | 103627337 | A | 3/2014 | |
| CN | 104015415 | A | 9/2014 | |
| CN | 104220934 | A | 12/2014 | |
| CN | 104220935 | A | 12/2014 | |
| CN | 104245340 | A | 12/2014 | |
| CN | 104271356 | A | 1/2015 | |
| CN | 104271686 | A | 1/2015 | |
| CN | 104284850 | A | 1/2015 | |
| CN | 104618642 | A | 5/2015 | |
| CN | 105058999 | A | 11/2015 | |
| CN | 102555450 | B | 3/2016 | |
| CN | 104271356 | B | 10/2016 | |
| CN | 103991293 | B | 1/2017 | |
| CN | 107111267 | A | 8/2017 | |
| CN | 107879147 | A | 4/2018 | |
| DE | 102012023389 | A1 * | 3/2009 | ............ B41J 2/0057 |
| DE | 102010060999 | A1 | 6/2012 | |
| DE | 102013001825 | A1 | 12/2013 | |
| EP | 0457551 | A2 | 11/1991 | |
| EP | 0499857 | A1 | 8/1992 | |
| EP | 0606490 | A1 | 7/1994 | |
| EP | 0609076 | A2 | 8/1994 | |
| EP | 0613791 | A2 | 9/1994 | |
| EP | 0676300 | A2 | 10/1995 | |
| EP | 0530627 | B1 | 3/1997 | |
| EP | 0784244 | A2 | 7/1997 | |
| EP | 0835762 | A1 | 4/1998 | |
| EP | 0843236 | A2 | 5/1998 | |
| EP | 0854398 | A2 | 7/1998 | |
| EP | 0953450 | A1 | 11/1999 | |
| EP | 1013466 | A2 | 6/2000 | |
| EP | 1146090 | A2 | 10/2001 | |
| EP | 1158029 | A1 | 11/2001 | |
| EP | 0825029 | B1 | 5/2002 | |
| EP | 1247821 | A2 | 10/2002 | |
| EP | 1271263 | A1 | 1/2003 | |
| EP | 0867483 | B1 | 6/2003 | |
| EP | 0923007 | B1 | 3/2004 | |
| EP | 1454968 | A1 | 9/2004 | |
| EP | 1503326 | A1 | 2/2005 | |
| EP | 1777243 | A1 | 4/2007 | |
| EP | 2028238 | A1 | 2/2009 | |
| EP | 2042317 | A1 | 4/2009 | |
| EP | 2065194 | A2 | 6/2009 | |
| EP | 2228210 | A1 | 9/2010 | |
| EP | 2270070 | A1 | 1/2011 | |
| EP | 2042318 | B1 | 2/2011 | |
| EP | 2042325 | B1 | 2/2012 | |
| EP | 2634010 | A1 | 9/2013 | |
| EP | 2683556 | A1 | 1/2014 | |
| EP | 2075635 | B1 | 10/2014 | |
| EP | 3260486 | A1 | 12/2017 | |
| EP | 2823363 | B1 | 10/2018 | |
| GB | 748821 | A | 5/1956 | |
| GB | 1496016 | A | 12/1977 | |
| GB | 1520932 | A | 8/1978 | |
| GB | 1522175 | A | 8/1978 | |
| GB | 2321430 | A | 7/1998 | |
| JP | 48043941 | | 12/1973 | |
| JP | S5578904 | A | 6/1980 | |
| JP | S57121446 | U | 7/1982 | |
| JP | S6076343 | A | 4/1985 | |
| JP | S60199692 | A | 10/1985 | |
| JP | S6223783 | A | 1/1987 | |
| JP | S63274572 | A | 11/1988 | |
| JP | H03248170 | A | 11/1991 | |
| JP | H05147208 | A | 6/1993 | |
| JP | H05192871 | A | 8/1993 | |
| JP | H05297737 | A | 11/1993 | |
| JP | H06954 | A | 1/1994 | |
| JP | H06100807 | A | 4/1994 | |
| JP | H06171076 | A | 6/1994 | |
| JP | H06345284 | A | 12/1994 | |
| JP | H07112841 | A | 5/1995 | |
| JP | H07186453 | A | 7/1995 | |
| JP | H07238243 | A | 9/1995 | |
| JP | H0862999 | A | 3/1996 | |
| JP | H08112970 | A | 5/1996 | |
| JP | 2529651 | B2 | 8/1996 | |
| JP | H09123432 | A | 5/1997 | |
| JP | H09157559 | A | 6/1997 | |
| JP | H09174646 | A | 7/1997 | |
| JP | H09281851 | A | 10/1997 | |
| JP | H09300678 | A | 11/1997 | |
| JP | H09314867 | A | 12/1997 | |
| JP | H10130597 | A | 5/1998 | |
| JP | H1142811 | A | 2/1999 | |
| JP | H11503244 | A | 3/1999 | |
| JP | H11106081 | A | 4/1999 | |
| JP | H11138740 | A | 5/1999 | |
| JP | H11245383 | A | 9/1999 | |
| JP | 2000094660 | A | 4/2000 | |
| JP | 2000108320 | A | 4/2000 | |

(56) References Cited

FOREIGN PATENT DOCUMENTS

| | | | |
|---|---|---|---|
| JP | 2000108334 | A | 4/2000 |
| JP | 2000141710 | A | 5/2000 |
| JP | 2000141883 | A | 5/2000 |
| JP | 2000168062 | A | 6/2000 |
| JP | 2000169772 | A | 6/2000 |
| JP | 2000190468 | A | 7/2000 |
| JP | 2000206801 | A | 7/2000 |
| JP | 2000337464 | A | 12/2000 |
| JP | 2000343025 | A | 12/2000 |
| JP | 2001088430 | A | 4/2001 |
| JP | 2001098201 | A | 4/2001 |
| JP | 2001139865 | A | 5/2001 |
| JP | 3177985 | B2 | 6/2001 |
| JP | 2001164165 | A | 6/2001 |
| JP | 2001199150 | A | 7/2001 |
| JP | 2001206522 | A | 7/2001 |
| JP | 2002020666 | A | 1/2002 |
| JP | 2002049211 | A | 2/2002 |
| JP | 2002504446 | A | 2/2002 |
| JP | 2002069346 | A | 3/2002 |
| JP | 2002103598 | A | 4/2002 |
| JP | 2002169383 | A | 6/2002 |
| JP | 2002229276 | A | 8/2002 |
| JP | 2002234243 | A | 8/2002 |
| JP | 2002278365 | A | 9/2002 |
| JP | 2002304066 | A | 10/2002 |
| JP | 2002326733 | A | 11/2002 |
| JP | 2002371208 | A | 12/2002 |
| JP | 2003057967 | A | 2/2003 |
| JP | 2003076159 | A | 3/2003 |
| JP | 2003094795 | A | 4/2003 |
| JP | 2003114558 | A | 4/2003 |
| JP | 2003145914 | A | 5/2003 |
| JP | 2003183557 | A | 7/2003 |
| JP | 2003211770 | A | 7/2003 |
| JP | 2003219271 | A | 7/2003 |
| JP | 2003246135 | A | 9/2003 |
| JP | 2003246484 | A | 9/2003 |
| JP | 2003267580 | A | 9/2003 |
| JP | 2003292855 | A | 10/2003 |
| JP | 2003313466 | A | 11/2003 |
| JP | 2004009632 | A | 1/2004 |
| JP | 2004011263 | A | 1/2004 |
| JP | 2004019022 | A | 1/2004 |
| JP | 2004025708 | A | 1/2004 |
| JP | 2004034441 | A | 2/2004 |
| JP | 2004077669 | A | 3/2004 |
| JP | 2004114377 | A | 4/2004 |
| JP | 2004114675 | A | 4/2004 |
| JP | 2004117118 | A | 4/2004 |
| JP | 2004148687 | A | 5/2004 |
| JP | 2004167902 | A | 6/2004 |
| JP | 2004231711 | A | 8/2004 |
| JP | 2004524190 | A | 8/2004 |
| JP | 2004261975 | A | 9/2004 |
| JP | 2004325782 | A | 11/2004 |
| JP | 2004340983 | A | 12/2004 |
| JP | 2005014255 | A | 1/2005 |
| JP | 2005014256 | A | 1/2005 |
| JP | 2005114769 | A | 4/2005 |
| JP | 2005215247 | A | 8/2005 |
| JP | 2005224737 | A | 8/2005 |
| JP | 2005307184 | A | 11/2005 |
| JP | 2005319593 | A | 11/2005 |
| JP | 2006001688 | A | 1/2006 |
| JP | 2006023403 | A | 1/2006 |
| JP | 2006095870 | A | 4/2006 |
| JP | 2006102975 | A | 4/2006 |
| JP | 2006137127 | A | 6/2006 |
| JP | 2006143778 | A | 6/2006 |
| JP | 2006152133 | A | 6/2006 |
| JP | 2006224583 | A | 8/2006 |
| JP | 2006231666 | A | 9/2006 |
| JP | 2006234212 | A | 9/2006 |
| JP | 2006243212 | A | 9/2006 |
| JP | 2006256087 | A | 9/2006 |
| JP | 2006263984 | A | 10/2006 |
| JP | 2006347081 | A | 12/2006 |
| JP | 2006347085 | A | 12/2006 |
| JP | 2007025246 | A | 2/2007 |
| JP | 2007041530 | A | 2/2007 |
| JP | 2007069584 | A | 3/2007 |
| JP | 2007079159 | A | 3/2007 |
| JP | 2007190745 | A | 8/2007 |
| JP | 2007216673 | A | 8/2007 |
| JP | 2007253347 | A | 10/2007 |
| JP | 2007298774 | A | 11/2007 |
| JP | 2007334125 | A | 12/2007 |
| JP | 2008006816 | A | 1/2008 |
| JP | 2008018716 | A | 1/2008 |
| JP | 2008019286 | A | 1/2008 |
| JP | 2008036968 | A | 2/2008 |
| JP | 2008082820 | A | 4/2008 |
| JP | 2008137146 | A | 6/2008 |
| JP | 2008137239 | A | 6/2008 |
| JP | 2008139877 | A | 6/2008 |
| JP | 2008142962 | A | 6/2008 |
| JP | 2008183744 | A | 8/2008 |
| JP | 2008194997 | A | 8/2008 |
| JP | 2008532794 | A | 8/2008 |
| JP | 2008201564 | A | 9/2008 |
| JP | 2008238674 | A | 10/2008 |
| JP | 2008246787 | A | 10/2008 |
| JP | 2008246990 | A | 10/2008 |
| JP | 2008254203 | A | 10/2008 |
| JP | 2008255135 | A | 10/2008 |
| JP | 2009040892 | A | 2/2009 |
| JP | 2009045794 | A | 3/2009 |
| JP | 2009045851 | A | 3/2009 |
| JP | 2009045885 | A | 3/2009 |
| JP | 2009082835 | A | 4/2009 |
| JP | 2009083314 | A | 4/2009 |
| JP | 2009083317 | A | 4/2009 |
| JP | 2009083325 | A | 4/2009 |
| JP | 2009096175 | A | 5/2009 |
| JP | 2009148908 | A | 7/2009 |
| JP | 2009154330 | A | 7/2009 |
| JP | 2009154377 | A | 7/2009 |
| JP | 2009190366 | A | 8/2009 |
| JP | 2009190375 | A | 8/2009 |
| JP | 2009202355 | A | 9/2009 |
| JP | 2009214318 | A | 9/2009 |
| JP | 2009214439 | A | 9/2009 |
| JP | 2009532240 | A | 9/2009 |
| JP | 2009226805 | A | 10/2009 |
| JP | 2009226852 | A | 10/2009 |
| JP | 2009226886 | A | 10/2009 |
| JP | 2009226890 | A | 10/2009 |
| JP | 2009227909 | A | 10/2009 |
| JP | 2009233977 | A | 10/2009 |
| JP | 2009234219 | A | 10/2009 |
| JP | 2009240925 | A | 10/2009 |
| JP | 2009271422 | A | 11/2009 |
| JP | 2009279808 | A | 12/2009 |
| JP | 2010005502 | A | 1/2010 |
| JP | 2010005815 | A | 1/2010 |
| JP | 2010030300 | A | 2/2010 |
| JP | 2010054855 | A | 3/2010 |
| JP | 2010510357 | A | 4/2010 |
| JP | 2010105365 | A | 5/2010 |
| JP | 2010173201 | A | 8/2010 |
| JP | 2010184376 | A | 8/2010 |
| JP | 2010214885 | A | 9/2010 |
| JP | 4562388 | B2 | 10/2010 |
| JP | 2010228192 | A | 10/2010 |
| JP | 2010228392 | A | 10/2010 |
| JP | 2010234599 | A | 10/2010 |
| JP | 2010234681 | A | 10/2010 |
| JP | 2010240897 | A | 10/2010 |
| JP | 2010241073 | A | 10/2010 |
| JP | 2010247381 | A | 11/2010 |
| JP | 2010247528 | A | 11/2010 |
| JP | 2010258193 | A | 11/2010 |
| JP | 2010260204 | A | 11/2010 |

(56) References Cited

FOREIGN PATENT DOCUMENTS

| | | | |
|---|---|---|---|
| JP | 2010260287 | A | 11/2010 |
| JP | 2010260302 | A | 11/2010 |
| JP | 2010286570 | A | 12/2010 |
| JP | 2011002532 | A | 1/2011 |
| JP | 2011025431 | A | 2/2011 |
| JP | 2011031619 | A | 2/2011 |
| JP | 2011037070 | A | 2/2011 |
| JP | 2011064850 | A | 3/2011 |
| JP | 2011067956 | A | 4/2011 |
| JP | 2011126031 | A | 6/2011 |
| JP | 2011133884 | A | 7/2011 |
| JP | 2011144271 | A | 7/2011 |
| JP | 4743502 | B2 | 8/2011 |
| JP | 2011523601 | A | 8/2011 |
| JP | 2011168024 | A | 9/2011 |
| JP | 2011173325 | A | 9/2011 |
| JP | 2011173326 | A | 9/2011 |
| JP | 2011186346 | A | 9/2011 |
| JP | 2011189627 | A | 9/2011 |
| JP | 2011201951 | A | 10/2011 |
| JP | 2011224032 | A | 11/2011 |
| JP | 2012042943 | A | 3/2012 |
| JP | 2012086499 | A | 5/2012 |
| JP | 2012111194 | A | 6/2012 |
| JP | 2012126123 | A | 7/2012 |
| JP | 2012139905 | A | 7/2012 |
| JP | 2012150390 | A | 8/2012 |
| JP | 2012196787 | A | 10/2012 |
| JP | 2012201419 | A | 10/2012 |
| JP | 2013001081 | A | 1/2013 |
| JP | 2013020170 | A | 1/2013 |
| JP | 2013060299 | A | 4/2013 |
| JP | 2013091313 | A | 5/2013 |
| JP | 2013103474 | A | 5/2013 |
| JP | 2013104044 | A | 5/2013 |
| JP | 2013121671 | A | 6/2013 |
| JP | 2013129158 | A | 7/2013 |
| JP | 2014008609 | A | 1/2014 |
| JP | 2014047005 | A | 3/2014 |
| JP | 2014073675 | A | 4/2014 |
| JP | 2014094827 | A | 5/2014 |
| JP | 2014131843 | A | 7/2014 |
| JP | 2015058709 | A | 3/2015 |
| JP | 2015510848 | A | 4/2015 |
| JP | 2015516315 | A | 6/2015 |
| JP | 2015517928 | A | 6/2015 |
| JP | 2015202616 | A | 11/2015 |
| JP | 2015212082 | A | 11/2015 |
| JP | 2016074206 | A | 5/2016 |
| JP | 2016093999 | A | 5/2016 |
| JP | 2016179678 | A | 10/2016 |
| JP | 2016185688 | A | 10/2016 |
| JP | 2016539830 | A | 12/2016 |
| JP | 2017093178 | A | 5/2017 |
| JP | 2017149160 | A | 8/2017 |
| JP | 2018017429 | A | 2/2018 |
| JP | 2020014350 | A | 1/2020 |
| MX | 2014010683 | A | 10/2014 |
| MX | 2014010680 | A | 4/2015 |
| RU | 2180675 | C2 | 3/2002 |
| RU | 2282643 | C1 | 8/2006 |
| WO | WO-8600327 | A1 | 1/1986 |
| WO | WO-9307000 | A1 | 4/1993 |
| WO | WO-9401283 | A1 | 1/1994 |
| WO | WO-9604339 | A1 | 2/1996 |
| WO | WO-9631809 | A1 | 10/1996 |
| WO | WO-9707991 | A1 | 3/1997 |
| WO | WO-9736210 | A1 | 10/1997 |
| WO | WO-9821251 | A1 | 5/1998 |
| WO | WO-9855901 | A1 | 12/1998 |
| WO | WO-9912633 | A1 | 3/1999 |
| WO | WO-9942509 | A1 | 8/1999 |
| WO | WO-9943502 | A2 | 9/1999 |
| WO | WO-0064685 | A1 | 11/2000 |
| WO | WO-0154902 | A1 | 8/2001 |
| WO | WO-0170512 | A1 | 9/2001 |
| WO | WO-02068191 | A1 | 9/2002 |
| WO | WO-02078868 | A2 | 10/2002 |
| WO | WO-02094912 | A1 | 11/2002 |
| WO | WO-2004113082 | A1 | 12/2004 |
| WO | WO-2004113450 | A1 | 12/2004 |
| WO | WO-2006051733 | A1 | 5/2006 |
| WO | WO-2006069205 | A1 | 6/2006 |
| WO | WO-2006073696 | A1 | 7/2006 |
| WO | WO-2006091957 | A2 | 8/2006 |
| WO | WO-2007009871 | A2 | 1/2007 |
| WO | WO-2007145378 | A1 | 12/2007 |
| WO | WO-2008078841 | A1 | 7/2008 |
| WO | WO-2009025809 | A1 | 2/2009 |
| WO | WO-2009134273 | A1 | 11/2009 |
| WO | WO-2010042784 | A3 | 7/2010 |
| WO | WO-2010073916 | A1 | 7/2010 |
| WO | WO-2011142404 | A1 | 11/2011 |
| WO | WO-2012014825 | A1 | 2/2012 |
| WO | WO-2012148421 | A1 | 11/2012 |
| WO | WO-2013060377 | A1 | 5/2013 |
| WO | WO-2013087249 | A1 | 6/2013 |
| WO | WO-2013132339 | A1 | 9/2013 |
| WO | WO-2013132340 | A1 | 9/2013 |
| WO | WO-2013132343 | A1 | 9/2013 |
| WO | WO-2013132345 | A1 | 9/2013 |
| WO | WO-2013132356 | A1 | 9/2013 |
| WO | WO-2013132418 | A2 | 9/2013 |
| WO | WO-2013132419 | A1 | 9/2013 |
| WO | WO-2013132420 | A1 | 9/2013 |
| WO | WO-2013132424 | A1 | 9/2013 |
| WO | WO-2013132432 | A1 | 9/2013 |
| WO | WO-2013132438 | A2 | 9/2013 |
| WO | WO-2013132439 | A1 | 9/2013 |
| WO | WO-2013136220 | A1 | 9/2013 |
| WO | WO-2015026864 | A1 | 2/2015 |
| WO | WO-2015036864 | A1 | 3/2015 |
| WO | WO-2015036906 | A1 | 3/2015 |
| WO | WO-2015036960 | A1 | 3/2015 |
| WO | WO-2016166690 | A1 | 10/2016 |
| WO | WO-2017208152 | A1 | 12/2017 |
| WO | WO-2017208155 | A1 | 12/2017 |
| WO | WO-2017208246 | A1 | 12/2017 |
| WO | WO-2018100541 | A1 | 6/2018 |

OTHER PUBLICATIONS

Co-pending U.S. Appl. No. 18/137,488, filed Apr. 21, 2023.

IP.com search (Year: 2022).

JP2000094660A Machine Translation (by EPO and Google)—published Apr. 4, 2000; Brother Ind Ltd.

JP2000337464A Machine Translation (by EPO and Google)—published Dec. 5, 2000; Fuji Xerox Co Ltd.

JP2004117118A Machine Translation (by EPO and Google)—published Apr. 15, 2004; Nidec Copal Corp.

JP2006256087 Machine Translation (by EPO and Google)—published Sep. 28, 2006; Ricoh Printing Sys Ltd.

JP2009082835A Machine Translation (by EPO and Google)—published Apr. 23, 2009; Fujifilm Corp.

JP2012150390A Machine Translation (by EPO and Google)—published Aug. 9, 2012; Konica Minolta Business Tech.

JP2018017429A Machine Translation (by EPO and Google)—published Feb. 1, 2018; Rinnai KK.

JP2020014350A Machine Translation (by EPO and Google)—published Jan. 23, 2020; Toshiba Mitsubishi Elec Ind.

"Amino Functional Silicone Polymers", in Xiameter.COPYRGT. 2009 Dow Corning Corporation.

BASF , "JONCRYL 537", Datasheet , Retrieved from the internet : Mar. 23, 2007 p. 1.

Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352D0BC052E90CEC1257479002707D9/$FILE/DP6208E_0608_FL_Hostafinefordesignandcreativematerials.pdf].

CN101073937A Machine Translation (by EPO and Google)—published Nov. 21, 2007; Werner Kaman Maschinen Gmbh & [DE].

(56) References Cited

OTHER PUBLICATIONS

CN101096455A Machine Translation (EPO, PlatPat and Google) published on Jan. 2, 2008 Fujifilm Corp.
CN101177057 Machine Translation (by EPO and Google)—published May 14, 2008—Hangzhou Yuanyang Industry Co.
CN101248146A Machine Translation (EPO, PlatPat and Google) published on Aug. 20, 2008 Ricoh KK.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK [JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
CN101592896A Machine Translation (by EPO and Google)—published Dec. 2, 2009; Canon KK.
CN101820241A Machine Translation (by EPO and Google)—published Sep. 1, 2010; Canon KK.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics Co Ltd.
CN102300932A Machine Translation (by EPO and Google)—published Dec. 28, 2011; Yoshida Hiroaki et al.
CN102341249A Machine Translation (EPO, PlatPat and Google) published on Feb. 1, 2012 Eastman Kodak Co.
CN102529257A Machine Translation (by EPO and Google)—published Jul. 4, 2012; Nippon Synthetic Chem Ind.
CN102648095A Machine Translation (by EPO and Google)—published Aug. 22, 2012; Mars Inc.
CN102673209A Machine Translation (by EPO and Google)—published Sep. 19, 2012; Wistron Corp.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox Co Ltd.
CN103568483A Machine Translation (by EPO and Google)—published Feb. 12, 2014; Anhui Printing Mechanical & Electrical Co Ltd.
CN103627337A Machine Translation (by EPO and Google)—published Mar. 12, 2014; Suzhou Banlid New Material Co Ltd.
CN103991293B Machine Translation (by EPO and Google)—issued on Jan. 4, 2017; Miyakoshi Printing Machinery Co., Ltd, Junichi et al.
CN104015415A Machine Translation (by EPO and Google)—published Sep. 3, 2014; Avery Dennison Corp.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology Co Ltd.
CN107111267A Machine Translation (by EPO and Google)—published Aug. 29, 2017; Hewlett Packard Indigo Bv.
CN1121033A Machine Translation (by EPO and Google)—published Apr. 24, 1996; Kuehnle Manfred R [US].
CN1212229A Machine Translation (by EPO and Google)—published Mar. 31, 1999; Honta Industry Corp [JP].
CN1305895A Machine Translation (by EPO and Google)—published Aug. 1, 2001; IMAJE SA [FR].
CN1493514A Machine Translation (by EPO and Google)—published May 5, 2004; GD SPA, Boderi et al.
CN1543404A Machine Translation (by EPO and Google)—published Nov. 3, 2004; 3M Innovative Properties Co [US].
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
CN1703326A Machine Translation (by EPO and Google)—published Nov. 30, 2005; Nissha Printing [JP].
CN1809460A Machine Translation (by EPO and Google)—published Jul. 26, 2006; Canon KK.
CN1961015A Machine Translation (EPO, PlatPat and Google) published on May 9, 2007 Dainippon Ink & Chemicals.
CN201410787Y Machine Translation (by EPO and Google)—published Feb. 24, 2010; Zhejiang Chanx Wood Co Ltd.
Co-pending U.S. Appl. No. 16/590,397, filed Oct. 2, 2019.
Co-pending U.S. Appl. No. 17/155,121, filed Jan. 22, 2021.
Co-pending U.S. Appl. No. 17/676,398, filed Mar. 21, 2022.
Co-pending U.S. Appl. No. 17/773,609, inventors Benzion; Landa et al., filed on May 1, 2022.
Co-pending U.S. Appl. No. 17/842,860, filed Jun. 17, 2022.
DE102010060999 Machine Translation (by EPO and Google)—published Jun. 6, 2012; Wolf, Roland, Dr .-Ing.
Epomin Polyment, product information from Nippon Shokubai, dated Feb. 28, 2014.
Flexicon., "Bulk Handling Equipment and Systems: Carbon Black," 2018, 2 pages.
Furia, T.E., "CRC Handbook of Food Additives, Second Edition, vol. 1" CRC Press LLC, 1972, p. 434.
Handbook of Print Media, 2000, Springer Verlag, Berlin/Heidelberg/New York, pp. 127-136,748—With English Translation.
IP.com Search, 2018, 2 pages.
IP.com Search, 2019, 1 page.
IP.com search (Year: 2021).
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother Ind Ltd.
JP2000141710A Machine Translation (by EPO and Google)—published May 23, 2000; Brother Ind Ltd.
JP2000141883A Machine Translation (EPO, PlatPat and Google) published on May 23, 2000 Ricoh KK.
JP2000168062A Machine Translation (by EPO and Google)—published Jun. 20, 2000; Brother Ind Ltd.
JP2000169772 Machine Translation (by EPO and Google)—published Jun. 20, 2000; Tokyo Ink MFG Co Ltd.
JP2000190468A Machine Translation (EPO, PlatPat and Google) published on Jul. 11, 2000 Brother Ind Ltd.
JP2000206801 Machine Translation (by PlatPat English machine translation); published on Jul. 28, 2000, Canon KK, Kobayashi et al.
JP2000343025A Machine Translation (by EPO and Google)—published Dec. 12, 2000; Kyocera Corp.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; PFU Ltd.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical Co.
JP2002169383 Machine Translation (by EPO, PlatPat and Google)—published Jun. 14, 2002 Ricoh KK.
JP2002234243 Machine Translation (by EPO and Google)—published Aug. 20, 2002; Hitachi Koki Co Ltd.
JP2002278365 Machine Translation (by PlatPat English machine translation)—published Sep. 27, 2002 Katsuaki, Ricoh KK.
JP2002304066A Machine Translation (by EPO and Google)—published Oct. 18, 2002; PFU Ltd.
JP2002326733 Machine Translation (by EPO, PlatPat and Google)—published Nov. 12, 2002; Kyocera Mita Corp.

(56) References Cited

OTHER PUBLICATIONS

JP2002371208 Machine Translation (by EPO and Google)—published Dec. 26, 2002; Canon Inc.
JP2003076159A Machine Translation (by EPO and Google)—published Mar. 14, 2003, Ricoh KK.
JP2003094795A Machine Translation (by EPO and Google)—published Apr. 3, 2003; Ricoh KK.
JP2003114558 Machine Translation (by EPO, PlatPat and Google)—published Apr. 18, 2003 Mitsubishi Chem Corp, Yuka Denshi Co Ltd, et al.
JP2003145914A Machine Translation (by EPO and Google)—published May 21, 2003; Konishiroku Photo Ind.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo Ind.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings Inc.
JP2004011263A Machine Translation (by EPO and Google)—published Jan. 15, 2004; Sumitomo Denko Steel Wire KK.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings Inc.
JP2004034441A Machine Translation (by EPO and Google)—published Feb. 5, 2004; Konica Minolta Holdings Inc.
JP2004077669 Machine Translation (by PlatPat English machine translation)—published Mar. 11, 2004 Fuji Xerox Co Ltd.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy Ind Ltd.
JP2004167902A Machine Translation (by EPO and Google)—published Jun. 17, 2004; Nippon New Chrome KK.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2004325782A Machine Translation (by EPO and Google)—published Nov. 18, 2004; Canon KK.
JP2004340983A Machine Translation (by EPO and Google)—published Dec. 2, 2004; Ricoh KK.
JP2004524190A Machine Translation (by EPO and Google)—published Aug. 12, 2004; Avery Dennison Corp.
JP2005014255 Machine Translation (by EPO and Google)—published Jan. 20, 2005; Canon Inc.
JP2005014256 Machine Translation (by EPO and Google)—published Jan. 20, 2005; Canon Inc.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005224737A Machine Translation (by EPO and Google)—published Aug. 25, 2005; Mitsubishi Paper Mills Ltd.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film Co Ltd.
JP2006102975 Machine Translation (by EPO and Google)—published Apr. 20, 2006; Fuji Photo Film Co Ltd.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2006234212A Machine Translation (by EPO and Google)—published Sep. 7, 2006; Matsushita Electric Ind Co Ltd.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.
JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson Corp.
JP2007041530A Machine Translation (by EPO and Google)—published Feb. 15, 2007; Fuji Xerox Co Ltd.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007216673 Machine Translation (by EPO and Google)—published Aug. 30, 2007 Brother Ind.
JP2007253347A Machine Translation (by EPO and Google)—published Oct. 4, 2007; Ricoh KK, Matsuo et al.
JP2008006816 Machine Translation (by EPO and Google)—published Jan. 17, 2008; Fujifilm Corp.
JP2008018716 Machine Translation (by EPO and Google)—published Jan. 31, 2008; Canon Inc.
JP2008082820A Machine Translation (by EPO and Google)—published Apr. 10, 2008; Ricoh KK.
JP2008137146A Machine Translation (by EPO and Google)—published Jun. 19, 2008; CBG ACCIAI SRL.
JP2008137239A Machine Translation (by EPO and Google); published on Jun. 19, 2008, Kyocera Mita Corp.
JP2008139877A Machine Translation (by EPO and Google)—published Jun. 19, 2008; Xerox Corp.
JP2008142962 Machine Translation (by EPO and Google)—published Jun. 26, 2008; Fuji Xerox Co Ltd.
JP2008183744A Machine Translation (by EPO and Google)—published Aug. 14, 2008, Fuji Xerox Co Ltd.
JP2008194997A Machine Translation (by EPO and Google)—published Aug. 28, 2008; Fuji Xerox Co Ltd.
JP2008201564 Machine Translation (English machine translation)—published Sep. 4, 2008 Fuji Xerox Co Ltd.
JP2008238674A Machine Translation (by EPO and Google)—published Oct. 9, 2008; Brother Ind Ltd.
JP2008246990 Machine Translation (by EPO and Google)—published Oct. 16, 2008, Jujo Paper Co Ltd.
JP2008254203A Machine Translation (by EPO and Google)—published Oct. 23, 2008; Fujifilm Corp.
JP2008255135 Machine Translation (by EPO and Google)—published Oct. 23, 2008; Fujifilm Corp.
JP2009045794 Machine Translation (by EPO and Google)—published Mar. 5, 2009; Fujifilm Corp.
JP2009045851A Machine Translation (by EPO and Google); published on Mar. 5, 2009, Fujifilm Corp.
JP2009045885A Machine Translation (by EPO and Google)—published Mar. 5, 2009; Fuji Xerox Co Ltd.
JP2009083314 Machine Translation (by EPO, PlatPat and Google)—published Apr. 23, 2009 Fujifilm Corp.

(56) References Cited

OTHER PUBLICATIONS

JP2009083317 Abstract; Machine Translation (by EPO and Google)—published Apr. 23, 2009; Fuji Film Corp.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm Corp.
JP2009148908A Machine Translation (by EPO and Google)—published Jul. 9, 2009; Fuji Xerox Co Ltd.
JP2009154330 Machine Translation (by EPO and Google)—published Jul. 16, 2009; Seiko Epson Corp.
JP2009154377A Machine Translation (by EPO and Google)—published Jul. 16, 2009; Fujifilm Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009226805A Machine Translation (by EPO and Google)—published Oct. 8, 2009; Fuji Xerox Co Ltd.
JP2009226852 Machine Translation (by EPO and Google)—published Oct. 8, 2009; Hirato Katsuyuki, Fujifilm Corp.
JP2009226890A Machine Translation (by EPO and Google)—published Oct. 8, 2009; Fuji Xerox Co Ltd.
JP2009227909A Machine Translation (EPO, PlatPat and Google) published on Oct. 8, 2009 Fujifilm Corp.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm CORP.
JP2009240925A Machine Translation (by EPO and Google)—published Oct. 22, 2009; Fujifilm Corp.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper Co Ltd.
JP2010234599A Machine Translation (by EPO and Google)—published Oct. 21, 2010; Duplo Seiko Corp et al.
JP2010234681A Machine Translation (by EPO and Google)—published Oct. 21, 2010; Riso Kagaku Corp.
JP2010240897A Machine Translation (by EPO and Google)—published Oct. 28, 2010; Toppan Printing Co Ltd.
JP2010241073 Machine Translation (by EPO and Google)—published Oct. 28, 2010; Canon Inc.
JP2010247381A Machine Translation (by EPO and Google); published on Nov. 4, 2010, Ricoh Co Ltd.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon KK.
JP2010260302A Machine Translation (by EPO and Google)—published Nov. 18, 2010; Riso Kagaku Corp.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011031619A Machine Translation (by EPO and Google)—published Feb. 17, 2011; Xerox Corp.
JP2011037070A Machine Translation (by EPO and Google)—published Feb. 24, 2011; Riso Kagaku Corp.
JP2011064850A Machine Translation (by EPO and Google)—published Mar. 31, 2011; Seiko Epson Corp.
JP2011067956A Machine Translation (by EPO and Google)—published Apr. 7, 2011; Fuji Xerox Co Ltd.
JP2011126031A Machine Translation (by EPO and Google); published on Jun. 30, 2011, Kao Corp.
JP2011144271 Machine Translation (by EPO and Google)—published Jun. 28, 2011 Toyo Ink Sc Holdings Co Ltd.
JP2011168024A Machine Translation (EPO, PlatPat and Google) published on Sep. 1, 2011 Ricoh Co Ltd.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon Kk.
JP2011201951A Machine Translation (by PlatPat English machine translation); published on Oct. 13, 2011, Shin-Etsu Chemical Co Ltd, Todoroki et al.
JP2011224032 Machine Translation (by EPO & Google)—published Nov. 10, 2011, Mameita KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson Corp.
JP2012201419A Machine Translation (by EPO and Google)—published Oct. 22, 2012, Seiko Epson Corp.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.
JP2013103474 Machine Translation (by EPO and Google)—published May 30, 2013; Ricoh Co Ltd.
JP2013104044A Machine Translation (by EPO and Google)—published May 30, 2013; Three M Innovative Properties.
JP2013121671 Machine Translation (by EPO and Google)—published Jun. 20, 2013; Fuji Xerox Co Ltd.
JP2013129158 Machine Translation (by EPO and Google)—published Jul. 4, 2013; Fuji Xerox Co Ltd.
JP2014008609A Machine Translation (EPO, PlatPat and Google) published on Jan. 20, 2014 Seiko Epson Corp.
JP2014047005A Machine Translation (by EPO and Google)—published Mar. 17, 2014; Ricoh Co Ltd.
JP2014073675A Machine Translation (EPO and Google) published on Apr. 24, 2014 Ricoh Co Ltd.
JP2014094827A Machine Translation (by EPO and Google)—published May 22, 2014; Panasonic Corp.
JP2014131843A Machine Translation (by EPO and Google)—published Jul. 17, 2014; Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.

(56) References Cited

OTHER PUBLICATIONS

JP2016093999A Machine Translation (by EPO and Google)—published May 26, 2016; Canon KK.
JP2016179678A Machine Translation (EPO, PlatPat and Google) published on Oct. 13, 2016 Xerox Corp.
JP2016185688A Machine Translation (by EPO and Google)—published Oct. 27, 2016; Hitachi Industry Equipment Systems Co Ltd.
JP2017093178A Machine Translation (EPO and Google) published on May 25, 2017 Samsung Electronics Co Ltd.
JP2529651 B2 Machine Translation (by EPO and Google)—issued Aug. 28, 1996;OSAKA Sealing Insatsu KK.
JP4562388B2 Machine Translation (by EPO and Google)—published Oct. 13, 2010; SK Kaken Co Ltd.
JP4743502B2 Machine Translation (by EPO and Google)—published Aug. 10, 2011; Fujifilm Corp.
JP48043941 Machine Translation (by EPO and Google)—published Dec. 21, 1973.
JPH03248170A Machine Translation (by EPO & Google)—published Nov. 6, 1991; Fujitsu Ltd.
JPH05147208 Machine Translation (by EPO and Google)—published Jun. 15, 1993-Mita Industrial Co Ltd.
JPH06100807 Machine Translation (by EPO and Google)—published Apr. 12, 1994; Seiko Instr Inc.
JPH06171076A Machine Translation (by PlatPat English machine translation)—published Jun. 21, 1994, Seiko Epson Corp.
JPH06345284A Machine Translation (by EPO and Google); published on Dec. 20, 1994, Seiko Epson Corp.
JPH06954A Machine Translation (by EPO and Google)—published Jan. 11, 1994; Seiko Epson Corp.
JPH07186453A Machine Translation (by EPO and Google)—published Jul. 25, 1995; Toshiba Corp.
JPH07238243A Machine Translation (by EPO and Google)—published Sep. 12, 1995; Seiko Instr Inc.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial Co Ltd.
JPH09157559A Machine Translation (by EPO and Google)—published Jun. 17, 1997; Toyo Ink Mfg Co.
JPH09281851A Machine Translation (by EPO and Google)—published Oct. 31, 1997; Seiko Epson Corp.
JPH09300678A Machine Translation (by EPO and Google)—published Nov. 25, 1997; Mitsubishi Electric Corp.
JPH09314867A Machine Translation (by PlatPat English machine translation)—published Dec. 9, 1997, Toshiba Corp.
JPH10130597A Machine Translation (by EPO and Google)—published May 19, 1998; Sekisui Chemical Co Ltd.
JPH11106081A Machine Translation (by EPO and Google)—published Apr. 20, 1999; Ricoh KK.
JPH11138740A Machine Translation (by EPO and Google)—published May 25, 1999; Nikka KK.
JPH11245383A Machine Translation (by EPO and Google)—published Sep. 14, 1999; Xerox Corp.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987; Canon KK.
JPS63274572A Machine Translation (by EPO and Google)—published Nov. 11, 1988; Canon KK.
LAROSTAT 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityoflhings.com/water/alcohol; downloaded on Nov. 30, 2017.
Poly(vinyl acetate) data sheet. PolymerProcessing.com. Copyright 2010. http://polymerprocessing .com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; Zao Rezinotekhnika.
RU2282643C1 Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.
WO2013087249 Machine Translation (by EPO and Google)—published Jun. 20, 2013; Koenig & Bauer AG.
XIAMETER™ "OFS-0777 Siliconate Technical Data Sheet," Dec. 31, 2017, 5 pages. [Retrieved from the internet on Oct. 13, 2021]: <url: <a= href=>https://www.dow.com/en-us/document-viewer.html?ramdomVar=6236427586842315077docPath=/content/dam/dcc/documents/en-us/productdatasheet/95/95-4/95-435-01-xiameter-ofs-0777-siliconate.pdf.</url:>.
DE102013001825A1 Machine Translation (by EPO and Google)—published Dec. 19, 2013; Heidelberger Druckmasch AG.
JP2009190366A Machine Translation (by EPO and Google)—published Aug. 27, 2009; Fuji Xerox Co Ltd.
JP2017149160A Machine Translation (by EPO and Google)—published Aug. 31, 2017; Heidelberger Druckmasch AG.

* cited by examiner

PRINTING METHOD AND SYSTEM

CROSS-REFERENCE TO RELATED APPLICATIONS

This application is U.S. National Phase of PCT Application PCT/IB2020/061673, filed Dec. 9, 2020, which claims the benefit of U.S. Provisional Patent Application 62/954,516, filed Dec. 29, 2019. The disclosures of these related applications are incorporated herein by reference.

FIELD OF THE INVENTION

The present invention relates generally to digital printing, and particularly to methods and systems for cleaning a member of a digital printing system.

BACKGROUND OF THE INVENTION

Some printing systems may comprise assemblies for cleaning substrates.

For example, U.S. Patent Application Publication 2019/0016114 describes a printing apparatus capable of cleaning a transfer member continuously while downsizing the apparatus. The printing apparatus includes a cleaning roller configured to apply a cleaning liquid to the transfer member while rotating in contact with the transfer member, a liquid tank configured to reserve the cleaning liquid so that a part of the cleaning roller is immersed in the cleaning liquid, and a removal unit configured to remove a blot by contacting the surface of the cleaning roller which rotates in the liquid tank.

SUMMARY OF THE INVENTION

An embodiment of the present invention that is described herein provides a method of printing, the method includes applying, to an intermediate transfer member (ITM), one or more fluids including at least a printing fluid for forming an image on the ITM. At least part of the image is transferred from the ITM to a target substrate. Residues of the one or more fluids that were not transferred to the target substrate and remained on the ITM, are transferred from the ITM to one or more rotatable elements, and the residues are removed from the one or more rotatable elements.

In some embodiments, the one or more rotatable elements are positioned on a first side of the ITM, and including one or more additional rotatable elements positioned on a second side of the ITM, opposite the first side, so that at least a first rotatable element of the rotatable elements and at least a second rotatable element of the additional rotatable elements are facing one another, and transferring the residues includes engaging between the first and second rotatable elements. In other embodiments, applying the at least printing fluid includes applying a treatment fluid to the ITM, and engaging between the first and second rotatable elements is carried out at least when applying at least one of: (i) the treatment fluid, and (ii) the printing fluid to the ITM. In yet other embodiments, engaging between the first and second rotatable elements is carried out at predefined time intervals, and the method includes disengaging between the first and second rotatable elements outside the predefined time intervals.

In an embodiment, the ITM includes: (i) a first outer layer made from a first material and having a first structure, and (ii) a second outer layer made from a second material and having a second structure, and the first and second outer layers are formed so as to transfer the residues from the first outer layer to the second outer layer. In another embodiment, the ITM includes a first outer layer having a first adhesion force to the residues, and at least one of the first and second rotatable elements includes a second outer layer having a second adhesion force to the residues, such that the second adhesion force is larger than the first adhesion force, and transferring the residues includes engaging between the first and second outer layers.

In some embodiments, the second outer layer includes at least an alloy selected from a list consisting of: (a) electroless nickel, (b) hard chrome, (c) anodized coating, and (d) ceramic coating. In other embodiments, the second outer layer has an ISO grade surface roughness between N1 and N4. In yet other embodiments, at least one of the rotatable elements includes at least an alloy selected from a list consisting of: (a) aluminum, (b) metallic alloy, (c) ceramic compound, and (d) polymer.

In an embodiment, removing the residues includes at least one of: (a) scraping, (b) brushing, and (c) wiping the residues from the one or more rotatable elements. In another embodiment, removing the residues includes engaging between a surface of at least one of the respective rotatable elements and at least a scraper that is oriented, relative to the surface of the respective rotatable element, at an angle of between 55° and 65°.

In some embodiments, the ITM has a given width, and at least one of the rotatable elements includes a roller having a length equal to or larger than the given width. In other embodiments, the one or more rotatable elements are positioned on a first side of the ITM, and including one or more additional rotatable elements positioned on a second side of the ITM, opposite the first side, at least a first rotatable element of the rotatable elements and at least a second rotatable element of the additional rotatable elements are facing one another, and transferring the residues includes, at least when the ITM is moved, at least the first rotatable element and the second rotatable element are continuously engaged with one another.

There is additionally provided, in accordance with an embodiment of the present invention, a printing system, including (a) one or more stations, which are configured to apply, to an intermediate transfer member (ITM), one or more fluids including at least a printing fluid so as to form an image on the ITM (b) an image transfer station, which is configured to transfer at least part of the image from the ITM to a target substrate, and (c) an ITM cleaning station (ICLS), which is configured to: (i) transfer, from the ITM to one or more rotatable elements, residues of the one or more fluids that were not transferred to the target substrate and remained on the ITM, and (ii) remove the residues from the one or more rotatable elements.

DETAILED DESCRIPTION OF EMBODIMENTS

Overview

Figure 1:
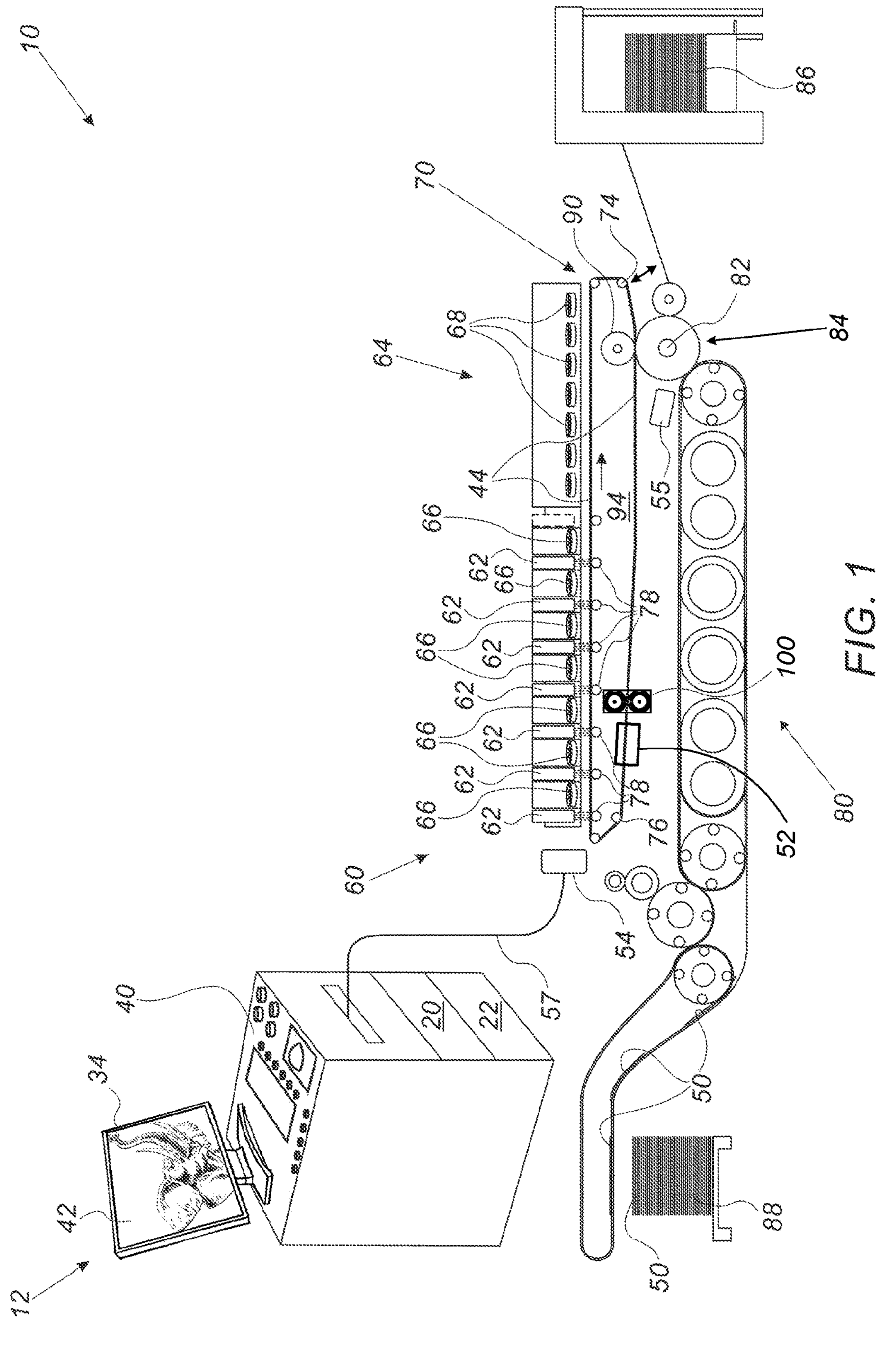
FIG. 1 is a schematic side view of a digital printing system, in accordance with an embodiment of the present invention.

Some printing processes may comprise forming an image using printing fluid on a surface of an intermediate substrate, such as one or more members or drums, and transferring the image from the intermediate substrate to a target substrate. In some cases, the printing fluid is not fully transferred and residues thereof may remain on the surface of the intermediate substrate. Such residues may contaminate the printing system, and may reduce the quality of subsequent images printed on respective target substrates.

Embodiments of the present invention that are described hereinbelow provide improved techniques for cleaning an intermediate transfer member (ITM) during the operation of a printing system. In some embodiments, a digital printing system comprises an image forming station, which is configured to print on the ITM, also referred to herein as a blanket, an image comprising ink or any other type of printing fluid. The digital printing system further comprises an image transfer station, which is configured to transfer the image from the ITM to a target substrate, such as a sheet or a continuous web substrate.

In some embodiments, the digital printing system further comprises an ITM cleaning station (ICLS), which is mounted in close proximity to the ITM. The ICLS is configured to transfer, from the ITM to one or more rotatable transfer rollers, residues that were not transferred to the target substrate and remained on the ITM.

In the context of the present invention and in the claims, the term “residues” refers to any type of solid, liquid, gas, or any combination thereof that is left, not intentionally, on the intermediate substrate after transferring the image from the ITM to the target substrate. For example, printing fluid, treatment fluid of the ITM, a combination thereof, various types or contaminants, or any other sort of substance not intended to be on the ITM surface after transferring the image from the ITM to the target substrate. Note that in some cases, a substance, such as a treatment fluid, may be intentionally applied to the ITM surface, and therefore, is not considered as a residue.

The ICLS is further configured to remove the residues from the respective one or more transfer rollers, e.g., using scraping blades, and to transfer the debris of the removed residues to a waste container using any suitable transferal technique.

In some embodiments, the ICLS may comprise one or more rotatable backing rollers, which are fixated, directly or indirectly, to a chassis of the digital printing system, e.g., coupled to an axis at the center of the backing roller, and are configured to rotate about the axis. The transfer rollers and the backing rollers are positioned on opposite sides of the ITM, and each pair of a transfer roller and a corresponding backing roller are facing one another.

In some embodiments, the transfer rollers and the scraping blades are coupled to first and second arms, respectively. The first and second arms are coupled to one another (e.g., using a pin), and to the aforementioned chassis using a hinge, such that each of the arms is configured to rotate about the hinge.

In some embodiments, the ICLS comprises a pneumatic piston assembly, which is configured to engage and disengage between the transfer rollers and the backing rollers by moving at least the first arm relative to the backing rollers. In an engaged position, the moving ITM rotates the transfer rollers and transfers the residues to the outer surface of the transfer rollers.

In some embodiments, the outermost layer of the ITM is a “release layer” having a given adhesion force to the printing fluid and the residues. The transfer roller comprises an outer layer having an adhesion force (to the residues) larger than that of the given adhesion force. In such embodiments, in the engaged position, the residues are transferred from the ITM to the transfer roller.

In some embodiments, the ICLS comprises a mechanism for engaging and disengaging between the scraping blades and the transfer rollers. When engaged, the one or more scraping blades are configured to remove the residues from the outer surface of the respective transfer roller.

The disclosed techniques improve the quality of printed images by reducing the number of defects formed during the printing process. Moreover, the disclosed techniques improve the productivity of printing systems by (a) cleaning the ITM during a printing process, and (b) reducing the number of contamination events during the printing process, and therefore, increasing the availability of such systems for producing printed images.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84, an ITM cleaning station (ICLS) 100, and a blanket treatment station 52. In the context of the present invention and in the claims, the terms “blanket” and “intermediate transfer member (ITM)” are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as “an ink image” (not shown) or as an “image” for brevity, of a digital image 42 on an upper run of a surface of blanket 44. Subsequently the ink image is transferred to a target substrate, (e.g., a paper, a folding carton, a multilayered polymer, or any suitable flexible package in a form of sheets or continuous web) located under a lower run of blanket 44.

In the context of the present invention, the term “run” refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, yellow and black. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis, also referred to herein as moving direction of blanket 44, represented by an arrow 94. In this configuration, accurate spacing between bars 62, and synchronization between directing the droplets of the ink of each bar 62 and moving blanket 44 are essential for enabling correct placement of the image pattern.

In some embodiments, system 10 comprises heaters, such as hot gas or air blowers 66 and/or infrared (IR) heaters or and other suitable type of heaters adapted for the printing application. In the example of FIG. 1, air blowers 66 are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller. Note that in the context of the present invention and in the claims, the terms “indicative of” and “indication” are used interchangeably.

Additionally or alternatively, blanket 44 may comprise an integrated encoder (not shown) for controlling the operation of various modules of system 10. One implementation of the integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer assembly 74. Dancer assembly 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer assembly 74.

In some embodiments, dancer assembly 74 may be motorized. The configuration and operation of rollers 76 and 78 are described in further detail, for example, in U.S. Patent Application Publication 2017/0008272 and in the above-mentioned PCT International Publication WO 2013/132424, whose disclosures are all incorporated herein by reference.

In some embodiments, system 10 may comprise one or more tension sensors (not shown) disposed at one or more positions along blanket 44. The tension sensors may be integrated in blanket 44 or may comprise sensors external to blanket 44 using any other suitable technique to acquire signals indicative of the mechanical tension applied to blanket 44. In some embodiments, processor 20 and additional controllers of system 10 (shown, for example, in FIGS. 2 and 3 below) are configured to receive the signals produce by the tension sensors, so as to monitor the tension applied to blanket 44 and to control the operation of dancer assembly 74.

In impression station 84, also referred to herein as an image transfer station, blanket 44 passes between an impression cylinder 82 and a pressure cylinder 90.

In some embodiments, system 10 comprises a control console 12, which is configured to control multiple modules of system 10, such as blanket module 70, image forming station 60 located above blanket module 70, and a substrate transport module 80, which is located below blanket module 70 and comprises one or more impression stations as will be described below.

In some embodiments, console 12 comprises a processor 20, typically a general-purpose computer, with suitable front end and interface circuits for interfacing with controllers of dancer assembly 74 and with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and/or various types of test patterns that may be stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52, the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket.

In some embodiments, blanket treatment station 52 may be positioned adjacent to image forming station 60, in addition to or instead of the position of blanket treatment station 52 shown in FIG. 1. In such embodiments, the blanket treatment station may comprise one or more bars, adjacent to print bars 62, and the treatment fluid is applied to blanket 44 by jetting.

In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied to blanket 44, by jetting, prior to the ink jetting at the image forming station.

In the example of FIG. 1, station 52 is mounted between impression station 84 and image forming station 60, yet, station 52 may be mounted adjacent to blanket 44 at any other or additional one or more suitable locations between impression station 84 and image forming station 60. As described above, station 52 may additionally or alternatively comprise on a bar adjacent to image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two or more impression cylinders so as to permit one or more duplex printing. The configuration of two impression cylinders also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancer assemblies, so as to maintain the upper run taut and to substantially isolate the upper run of blanket 44 from being affected by mechanical vibrations occurring in the lower run.

As described above, the ink image typically comprises a printing fluid, such as an aqueous ink having multiple colors of ink, and the aforementioned treatment fluid, applied to blanket 44 using blanket treatment station 52. In some cases, after transferring the ink image from blanket 44 to sheet 50, residues may remain on blanket 44 and may cause, inter-alia, scratches on blanket 44 and contamination of system 10. In some embodiments, system 10 comprises ITM cleaning station (ICLS) 100, typically mounted between impression station 84 and blanket treatment station 52. In some embodiments, ICLS 100 comprises one or more pairs of rotatable elements, in the present example one pair of rollers shown schematically engaged with one another. When engaged, the rollers are configured to remove from blanket 44, the aforementioned residues. ICLS 100 is described in more detail in FIGS. 2A and 2B below, and the blanket cleaning process is further described in FIG. 3 below.

Note that the components of both ICLS 100 and blanket treatment station 52 are positioned at both sides of blanket 44, as illustrated in FIG. 1, i.e. similarly for example to the components of the transfer station.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprise any suitable image sensor, such as a Contact Image Sensor (CIS) or a Complementary metal oxide semiconductor (CMOS) image sensor, and a scanner comprising a slit having a width of about one meter or any other suitable width.

In the context of the present disclosure and in the claims, the terms "about" or "approximately" for any numerical values or ranges indicate a suitable dimensional tolerance that allows the part or collection of components to function for its intended purpose as described herein. For example, "about" or "approximately" may refer to the range of values±20% of the recited value, e.g. "about 90%" may refer to the range of values from 72% to 100%.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor or controller connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color (C2C) registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a "master" or a "source image" of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Blanket Cleaning Station

Figure 2B:
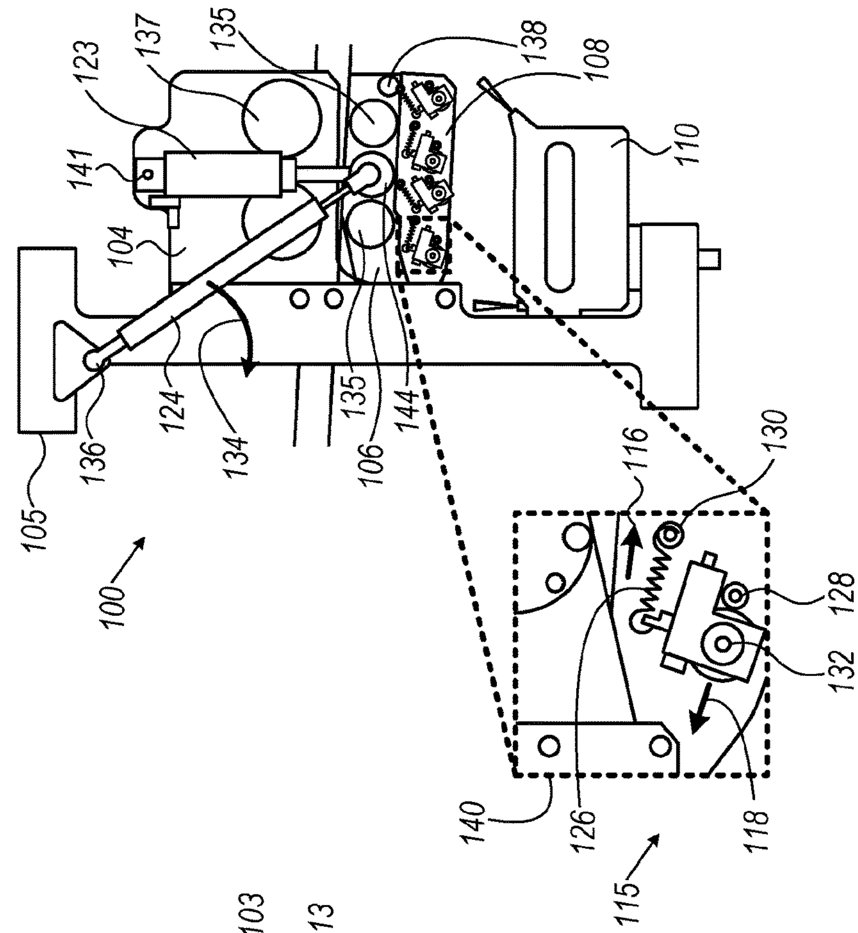
FIGS. 2A and 2B are schematic side views of a blanket cleaning station, in accordance with embodiments of the present invention.
Figure 2A:
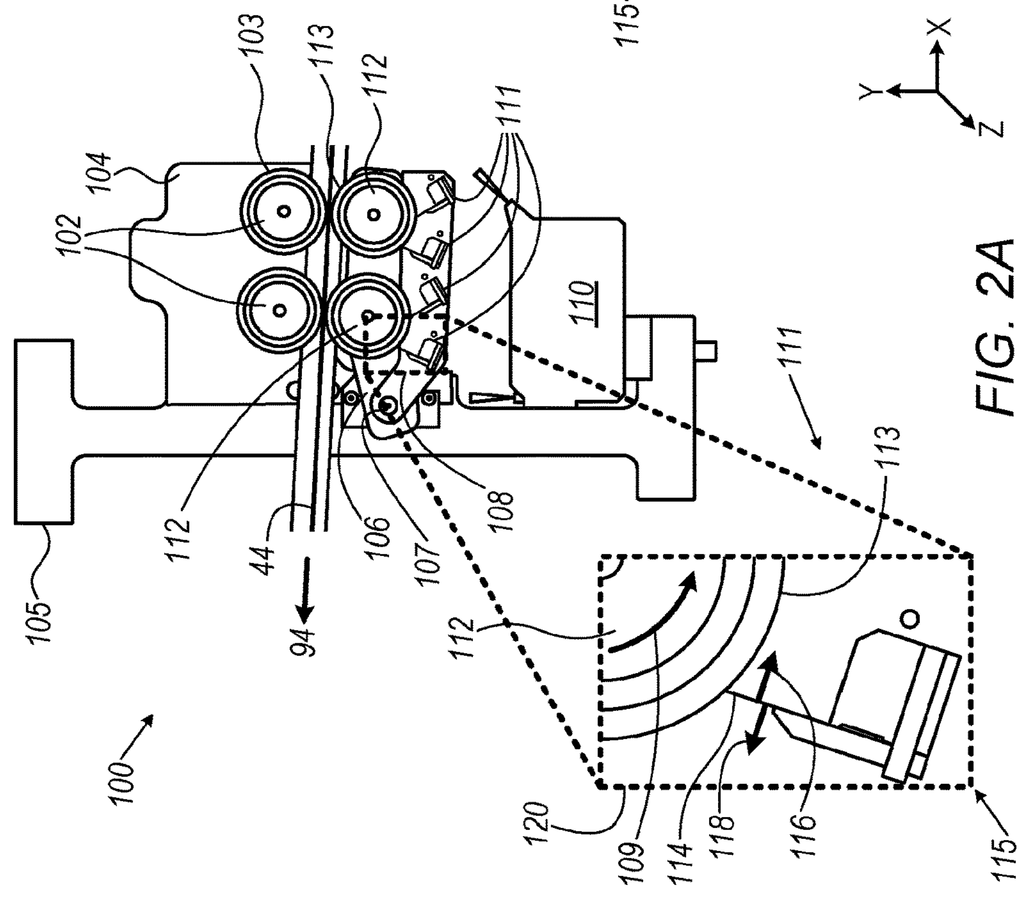

FIG. 2A is a schematic, side view of ITM cleaning station (ICLS) 100, in accordance with an embodiment of the present invention. In some embodiments, ICLS 100 comprises one or more rotatable elements, in the present example two similar backing rollers 102, coupled to a frame 104, which is mounted on a chassis 105 of system 10.

In some embodiments, each backing roller 102 has a circular cross section having a diameter of about 80 mm or any other suitable diameter. In the example of FIG. 2A, backing rollers 102 are fixated in X and Y axes, and are rotated by blanket 44 about Z-axis, when blanket 44 moves in the moving direction represented by arrow 94.

In some embodiments, each backing roller 102 may have a core comprising aluminum alloy, such as Al 6061-T6, or any other suitable alloy. The core of backing roller 102 may be coated with an outer layer 103 comprising any suitable type of soft material, such as ethylene propylene diene monomer (EPDM) rubber having a Shore-A hardness range between about 20 ShA and about 95 ShA.

In some embodiments, ICLS 100 comprises one or more additional rotatable elements, in the present example two transfer rollers 112 similar to one another, each of which having a circular cross section and a diameter of about 80 mm. Transfer roller 112 has a core comprising aluminum alloy, such as the aforementioned Al 6061-T6, or any other suitable metallic alloy, or ceramic compounds or polymers.

In some embodiments, the core of transfer roller 112 may be coated with an outer layer 113 comprising electroless nickel having an N2 ISO grade surface roughness. Based on the material properties and surface finishing, outer layer 113 is configured to receive residues transferred from blanket 44 as will be described in detail below.

Additionally or alternatively, outer layer 113 may comprise any other suitable material and roughness level configured to receive residues transferred from blanket 44. For example, outer layer 113 may comprise electroless-nickel, hard chrome, anodize or any suitable type of ceramic coating. Moreover, the roughness grade of outer layer 113 may have any suitable ISO grade surface roughness between N1 and N4.

In some embodiments, blanket 44 has a given width (e.g., about 1 meter) orthogonal to arrow 94, and at least one of rollers 102 and 112 (typically both) may have a length equal to or larger than the given width of blanket 44.

As shown in FIG. 2A, transfer rollers 112 and backing rollers 102 are located at opposite sides of blanket 44 and are facing one another. In this configuration, each pair of rollers 102 and 112 may prevent motion of blanket 44 at least along Y-axis, and enable motion of blanket 44 along the aforementioned moving direction, which is substantially parallel to X-axis. In the example of FIG. 2A, ICLS 100 comprises two pair of rollers 102 and 112. In other embodiments, however, ICLS 100 may comprise any other suitable number of rollers 102 and 112 (i.e. one or more pairs of rollers 102 and 112) arranged in any suitable configuration.

In some embodiments, transfer rollers 112 are mounted on a rigid arm 106, which is coupled to chassis 105 and is configured to rotate about a hinge 107. In some embodiments, ICLS 100 is configured to engage and disengage between rollers 102 and 112, as will be described in detail in FIG. 2B below.

As described in FIG. 1 above, blanket 44 receives an ink image from image forming station 60 and transfers the ink image to sheet 50 or any other target substrate. In some cases, after transferring the ink image from blanket 44 to sheet 50, residues may remain on blanket 44 and ICLS 100 is configured to remove these residues by transferring them from blanket 44 to transfer rollers 112 of ICLS 100. In some embodiments, the outer surface of blanket 44 comprises a release layer (not shown), which is configured to transfer the ink image to sheet 50, and subsequently to transfer the aforementioned residues to transfer rollers 112.

In some embodiments, a pair of engaged rollers 102 and 112 is configured to form a nip, through which blanket 44 passes. The nip formed between a pair of backing roller 102 and transfer roller 112 may be substantially similar to the nip formed between impression cylinder 82 and pressure cylinder 90, as described in FIG. 1 above, allowing transfer of the residues from the blanket to the transfer rollers.

In some embodiments, ICLS 100 comprises elements for removing the residues transferred to the surface of outer layer 113 of transfer rollers 112. In some embodiments, these residues removal elements, also referred to herein as residues cleaners, are configured to make physical contact with the surface of outer layer 113, so as to mechanically remove the residues when a respective transfer roller 112 rotates about its own axes.

In some embodiments, the residues cleaner may comprise one or more scraping blade assemblies 111, configured to clean the residues from each transfer roller 112. In the example of FIG. 2A, two scraping blade assemblies 111 are used for cleaning each transfer roller 112. In other embodiments, ICLS 100 may comprise any other suitable number of scraping blade assemblies 111.

In an embodiment, a single scraping blade assembly 111 may be sufficient for cleaning all residues from the surface of outer layer 113 of a respective transfer roller 112. In another embodiment, three or more scraping blade assemblies 111 may be used for cleaning a single transfer roller 112.

Note that each transfer roller 112 may have an independent number of scraping blade assemblies 111. For example, a first transfer roller 112 may be cleaned using a single scraping blade assembly 111, and a second transfer roller 112 may be cleaned using two or more scraping blade assemblies 111.

Note that the number of transfer rollers 112, and particularly, the number of scraping blade assemblies 111 applied for cleaning a respective transfer roller 112 may depend on the printing application and materials applied to blanket 44.

In some embodiments, scraping blade assemblies 111 are mounted on a rotatable arm 108, which is coupled to chassis 105 and is configured to rotate about hinge 107.

In other embodiments, the elements for removing the residues from transfer rollers 112 may comprise any other suitable types of residues cleaners, such as but not limited to a brush, a wiper, or a scrolling down cleaner.

Note that ICLS 100 may comprise one or more types of cleaners applied to a respective transfer roller 112. For example, a scraping blade assembly 111 and a brush.

In some embodiments, ICLS 100 is configured to engage and disengage between rollers 102 and 112, as will be described in detail in FIG. 2B below. In some embodiments, during normal operation of system 10, e.g., at least when blanket 44 is moved, at least one roller 112 and one roller 102, which is facing roller 112, are continuously engaged with one another, so as to transfer the residues from blanket 44 to roller 112.

In other embodiments, processor 20 controls ICLS 100 to engage between rollers 102 and 112 at predefined time intervals, such as during image transfer, and to disengage between rollers 102 and 112 outside the predefined time intervals.

In some embodiments, when blanket treatment station 52 constantly applies the treatment fluid to the surface of blanket 44 (as described in FIG. 1 above), ICLS 100 is operated so that the pairs of rollers 102 and 112 are constantly engaged to remove residues of the treatment fluid from the surface of blanket 44.

In other embodiments, ICLS 100 may be constantly in an engaged mode, in such embodiments, all pairs of rollers 102 and 112 are engaged all the time. Note that ICLS 100 is capable of operating in the engaged mode non-stop, and yet, has the capability to disengage between rollers 102 and 112 of one or more pairs, in case such an engagement is required. As described above, the engagement and disengagement operations between rollers 102 and 112 are controlled by processor 20.

Additionally or alternatively, the engagement between the pairs of rollers 102 and 112 may be carried out at least when applying the printing fluid (e.g., ink) to blanket 24.

In other embodiments, one or more (and typically both) pairs of rollers 102 and 112 may be engaged at least when blanket 44 is being moved in the moving direction shown by arrow 94.

In alternative embodiments, instead of the two pairs of rollers 102 and 112 shown in FIG. 2A, ICLS 100 may comprise a single pair of rollers 102 and 112. In other words, ICLS 100 may comprise one backing roller 102 and one transfer roller 112. In such embodiments, processor 20 is configured to control ICLS 100 to engage between rollers 102 and 112, and in some embodiments, also to disengage between rollers 102 and 112 as described in detail in FIG. 2B below. Note that the embodiments of the present disclosure that are described for multiple pairs of rollers 102 and 112, are applicable, mutatis mutandis, to any ITM cleaning station, such as ICLS 100, having the aforementioned single pair of rollers 102 and 112.

Reference is now made to an inset 120 showing scraping blade assembly 111. In some embodiments, scraping blade assembly 111 comprises a blade housing 115 and a blade 114. Blade housing 115 is configured to hold blade 114 and may comprise aluminum alloy, or any other suitable alloy. Blade 114 may comprise 1090 steel, or any other suitable alloy adapted for scraping the aforementioned residues away from the surface of outer layer 113 of the respective transfer roller 112.

In some embodiments, processor 20 is configured to control scraping blade assembly 111 to (a) engage between blade 114 and the surface of outer layer 113 by moving blade 114 in direction 116, or (b) disengage between blade 114 and the surface of outer layer 113 by moving blade 114 in direction 118. In an embodiment, blade housing 115 is configured to engage and disengage between blade 114 and the surface of outer layer 113, as will be described in detail in FIG. 2B below.

In some embodiment, during the operation of system 10, blanket 44 rotates transfer roller 112 counterclockwise (shown as an arrow 109) when moving in the direction of arrow 94. In some embodiments, when image forming station 60 applies the ink droplets to blanket 44, processor 20 controls scraping blade assembly 111 to move blade 114 in direction 116 so as to remove the residues from the surface of outer layer 113 as described above. The debris of the removed residues is transferred to a waste tray 110, for example, dropped by gravity force or moved to any other suitable waste container using any other suitable technique.

In some embodiments, system 10 may operate without applying ink droplets to blanket 44. For example, when starting up system 10 or during maintenance, blanket treatment station 52 may apply the aforementioned treatment fluid to the surface of blanket 44. In such embodiments, processor 20 is configured to control scraping blade assembly 111 to move blade 114 in direction 118 so as to disengage from the surface of outer layer 113 and prevent the treatment fluid removal from outer layer 113.

Note that after using the treatment fluid, processor 20 may control scraping blade assembly 111 to move blade 114 to direction 116, so as to remove the used treatment fluid from the surface of outer layer 113.

In some embodiments, scraping blade assembly 111 may comprise any suitable number of blades 114. Specifically, in case ICLS 100 comprises a single pair of rollers 102 and 112, scraping blade assembly 111 may comprise any suitable number of blades 114. For example, scraping blade assembly 111 may comprise one blade 114 (such as the blade shown in inset 120), two blades 114 (as shown in FIG. 2A), or more than two blades 114. Moreover, even when comprising a single pair of rollers 102 and 112, blade assembly 111 may comprise a combination of one or more blades 111 and other cleaning elements, such as a brush, as described above.

FIG. 2B is a schematic, side view of engagement and disengagement assemblies of ICLS 100, in accordance with an embodiment of the present invention. Note that in FIG. 2B, ICLS 100 is shown without rollers 102 and 112, and without blades 114.

In some embodiments, ICLS 100 comprises a pneumatic piston assembly 123, which is coupled at one end to frame 104 using a screw 141 or any other suitable fixating technique. The other end of piston assembly 123 is coupled to a mount 144, which is hooked to arm 106 and positioned between dead shafts 135 of transfer rollers 102. Note that although dead shafts 137 of transfer rollers 102 appear in FIG. 2B larger than dead shafts 135 of transfer rollers 112, the actual diameter of rollers 102 and 112 is similar (e.g., about 80 mm) as described in FIG. 2A above. In some embodiments, piston assembly 123 comprises one or more pneumatic pistons (not shown) having any suitable diameter, such as about 40 mm.

In some embodiments, processor 20 is configured to control piston assembly 123 to disengage between rollers 102 and 112 by pushing mount 144 along Y axis toward waste tray 110. As shown in FIG. 2A above, arms 106 and 108 may rotate about hinge 107, so that transfer rollers 112 are moved away from blanket 44 and are disengaged from backing rollers 102.

In some embodiments, ICLS 100 comprises one or more gas springs 124 coupled to a hinge 136 mounted on chassis 105, and a screw 138, configured to fixate arms 106 and 108 to one another. In an embodiment, gas springs 124 are configured to hold at least arm 106 during maintenance, e.g., during replacement of one or more rollers 102 and/or 112, and/or during replacement of one or more blades 114. For example, in blade replacement, screw 138 is pulled out of ICLS 100, so as to decouple between arms 106 and 108. In roller replacement, piston assembly 123 is decoupled from mount 144, and gas springs 124 enable a controlled rotation of arms 106 and 108 about hinge 107.

In other embodiments, ICLS 100 may comprise a single pair of rollers 102 and 112, and the aforementioned one or more gas springs 124 may be excluded from the configuration of ICLS 100. In such embodiments, the pair of rollers 102 and 112 may be positioned in close proximity to chassis 105, and piston assembly 123 may be sufficient for pushing mount 144 along Y axis toward waste tray 110, as described above. This configuration allows to carry out the maintenance work described above, and/or to perform any suitable maintenance work on impression cylinder 82, without having gas spring 124.

In alternative embodiments, instead of the aforementioned one or more gas springs 124, ICLS 100 may comprise any other suitable type of apparatus configured to fixate arms 106 and 108 to one another.

Reference is now made to an inset 140 showing components of blade housing 115. Note that blade 114 and parts of blade housing 115 were removed from inset 140 for the description of elements related to the movement of blade 114 in directions 116 and 118 described in inset 120 if FIG. 2A above.

In some embodiments, blade housing 115 comprises a spring 126, which is coupled to a screw 130 and is configured to pull blade 114 in direction 116 by rotating blade housing 115 clockwise about a hinge 132. Additionally or alternatively, blade housing 115 may comprise any other suitable type of apparatus, such as but not limited to, a piston (not shown), which is configured to apply a controllable and/or tunable force for pulling blade 114 in direction 116, as described above for spring 126.

In some embodiments, blade housing 115 comprises an eccentric screw 128 having at least two positions. In the first position eccentric screw 128 is configured to rotate blade housing 115 counterclockwise about hinge 132, so as to push blade 114 in direction 118. In the second position, eccentric screw 128 is typically not applying force to housing 115 and spring 126 couples blade 114 to the surface of outer layer 113 as described above and shown in inset 120 of FIG. 2A above.

In some embodiments, processor 20 is configured to control the engagement and disengagement between blade 114 and transfer roller 112 by controlling the position of eccentric screw 130. In such embodiments, when eccentric screw 130 is in the first position, blade 114 and transfer roller 112 are disengaged from one another, whereas when eccentric screw 130 is in the second position, blade 114 and transfer roller 112 are engaged with one another. Note that processor 20 is further configured to position eccentric screw 130 in any position between the first position and the second position.

In other embodiments, ICLS 100 may comprise any other suitable mechanism for controlling the engagement and disengagement between blade 114 and transfer roller 112.

The particular configuration of ICLS 100 is shown by way of example, in order to illustrate certain problems, such as contamination and scratch, which are addressed by embodiments of the present invention and to demonstrate the application of these embodiments in enhancing the performance of ICLS 100 and system 10. Embodiments of the present invention, however, are by no means limited to this specific sort of example cleaning station and printing system, and the principles described herein may similarly be applied to other sorts of cleaning stations and printing systems.

Figure 3:
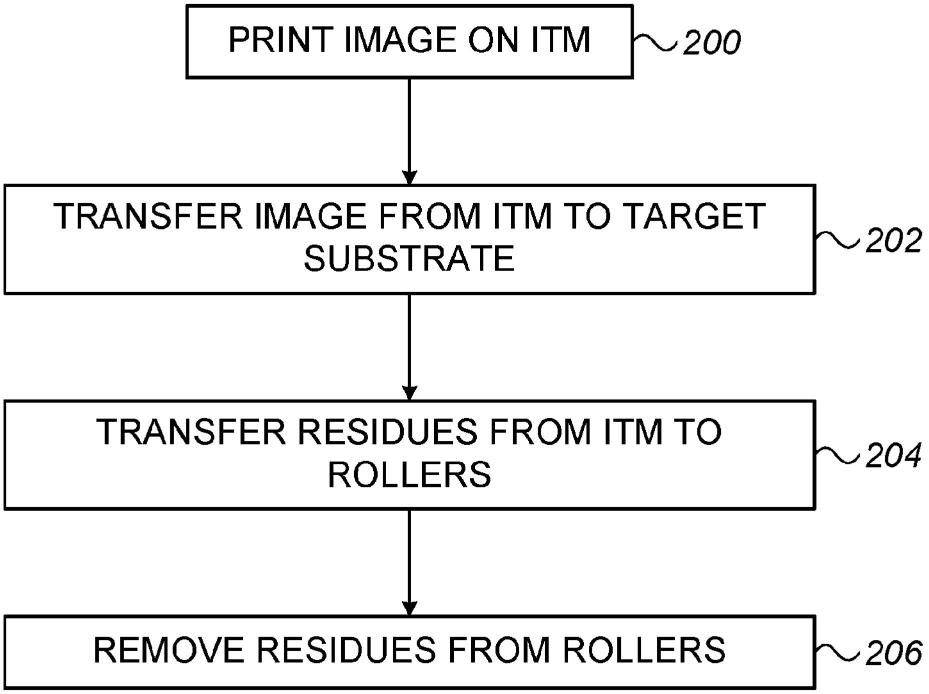
FIG. 3 is a flow chart that schematically illustrates a method for cleaning residues of an image that were not transferred to a target substrate, in accordance with an embodiment of the present invention.

FIG. 3 is a flow chart that schematically illustrates a method for cleaning residues that were not transferred to sheet 50, in accordance with an embodiment of the present invention.

The method begins at an image printing step 200 with processor 20 controlling image forming station 60 to apply ink droplets to blanket 44 so as to form an image thereon. At an image transferring step 202, processor 20 controls blanket module 70 and impression station 84 to transfer the image from blanket 44 to sheet 50.

In some cases, residues that were not transferred to sheet 50, may remain on blanket 44. At a residues transferring step 204, processor 20 controls ICLS 100 to engage between rollers 102 and 112 having blanket 44 therebetween, so as to transfer the residues from blanket 44 to one or more rotatable elements, such as transfer rollers 112.

As described in FIG. 2A above, the release layer of blanket 44 is adapted to transfer (the ink image and) the residues, and the outer surface of outer layer 113 is adapted to receive the residues, so that the residues are transferred from blanket 44 to one or more transfer rollers 112.

In some embodiments, the outer surface of outer layer 113 may have a given adhesion force to the residues, which is larger than the adhesion force of blanket 44 to the residues. In such embodiments, when engaging between rollers 102 and 112, the release layer of blanket 44 is engaged with the outer surface of outer layer 113 and the residues are transferred to outer layer 113.

At a residues removal step 206 that concludes the method, processor 20 controls ICLS 100 to engage between one or more blades 114 and the outer surface of outer layer 113, so as to remove the residues from transfer rollers 112.

In some embodiments, processor 20 is configured to control ICLS 100 to repeat the method described above for every new image applied to a respective section of blanket 44.

Although the embodiments described herein mainly address methods and apparatus for cleaning residues from an ITM of a digital printing system, the methods and systems described herein can also be used in other applications, such as in cleaning any sort of contamination from any flexible substrate.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method of printing, comprising:
- moving an intermediate transfer member (ITM) that is placed over one or more rollers, by rotating the one or more rollers;
- applying to the ITM one or more fluids comprising at least a printing fluid for forming an image on the ITM;
- transferring at least part of the image from the ITM to a target substrate;
- engaging between (i) one or more rotatable elements positioned on a first side of the ITM, and (ii) one or more additional rotatable elements positioned on a second side of the ITM, opposite the first side, wherein both the one or more rotatable elements and the one or more additional rotatable elements are different from the one or more rollers that rotate the ITM, and wherein at least a first rotatable element of the rotatable elements and at least a second rotatable element of the additional rotatable elements are facing one another;
- transferring, from the ITM to the one or more rotatable elements, residues of the one or more fluids that were not transferred to the target substrate and remained on the ITM; and
- removing the residues from the one or more rotatable elements.

2. The method according to claim 1, wherein applying the at least a printing fluid comprises applying a treatment fluid to the ITM, and wherein engaging between the first and second rotatable elements is carried out at least when applying at least one of: (i) the treatment fluid, and (ii) the printing fluid to the ITM.

3. The method according to claim 1, wherein engaging between the first and second rotatable elements is carried out at predefined time intervals, and comprising disengaging between the first and second rotatable elements outside the predefined time intervals.

4. The method according to claim 1, wherein at least one of the rotatable elements comprises at least an alloy selected from a list consisting of: (a) aluminum, (b) metallic alloy, (c) ceramic compound, and (d) polymer.

5. The method according to claim 1, wherein removing the residues comprises at least one of: (a) scraping, (b) brushing, and (c) wiping the residues from the one or more rotatable elements.

6. The method according to claim 1, wherein removing the residues comprises engaging between a surface of at least one of the respective rotatable elements and at least a scraper that is oriented, relative to the surface of the respective rotatable element, at an angle of between 55° and 65°.

7. The method according to claim 1, wherein transferring the residues comprises, at least when the ITM is moved, at least the first rotatable element and the second rotatable element are continuously engaged with one another.

8. The method according to claim 1, wherein the first rotatable element has a first diameter, and the second rotatable element has a second diameter, equal to the first diameter.

9. A printing system, comprising:

one or more stations, which are configured to apply, to an intermediate transfer member (ITM), one or more fluids comprising at least a printing fluid so as to form an image on the ITM;

an image transfer station comprising one or more rollers configured to be rotated for moving the ITM, the image transfer station is configured to transfer at least part of the image from the ITM to a target substrate;

an ITM cleaning station (ICLS) comprising (a) one or more rotatable elements positioned on a first side of the ITM and (b) one or more additional rotatable elements positioned on a second side of the ITM, opposite the first side, wherein both the one or more rotatable elements and the one or more additional rotatable elements are different from the one or more rollers of the image transfer station, and wherein at least a first rotatable element of the rotatable elements and at least a second rotatable element of the additional rotatable elements are facing one another, wherein the ICLS is configured to: (i) transfer, from the ITM to the one or more rotatable elements, residues of the one or more fluids that were not transferred to the target substrate and remained on the ITM, and (ii) remove the residues from the one or more rotatable elements; and a processor, which is configured to control the ICLS to engage between the first and second rotatable elements for transferring the residues.

10. The system according to claim 9, wherein the one or more stations are configured to apply to the ITM a treatment fluid, and wherein the processor is configured to control the ICLS to engage between the first and second rotatable elements at least when the one or more stations apply to the ITM, at least one of: (i) the treatment fluid, and (ii) the printing fluid.

11. The system according to claim 9, wherein the processor is configured to control the ICLS to engage between the first and second rotatable elements at predefined time intervals, and to disengage between the first and second rotatable elements outside the predefined time intervals.

12. The system according to claim 9, wherein the ITM comprises a first outer layer made from a first material, and wherein at least one of the first and second rotatable elements comprises a second outer layer made from a second material, and wherein the first and second outer layers are formed so as to transfer the residues from the first outer layer to the second outer layer.

13. The system according to claim 12, wherein the second outer layer comprises at least an alloy selected from a list consisting of: (a) electroless nickel, (b) hard chrome, (c) anodized coating, and (d) ceramic coating.

14. The system according to claim 12, wherein the second outer layer has an ISO grade surface roughness between N1 and N4.

15. The system according to claim 9, wherein the ITM comprises a first outer layer having a first adhesion force to the residues, and wherein at least one of the first and second rotatable elements comprises a second outer layer having a second adhesion force to the residues, wherein the second adhesion force is larger than the first adhesion force.

16. The system according to claim 9, wherein at least one of the rotatable elements comprises at least an alloy selected from a list consisting of: (a) aluminum, (b) metallic alloy, (c) ceramic compound, and (d) polymer.

17. The system according to claim 9, wherein the ICLS comprises at least one of: (a) a scrapper, (b) a brush, and (c) a wiper, configured to remove the residues from the one or more rotatable elements.

18. The system according to claim 9, wherein the ICLS is configured to remove the residues by engaging between a surface of at least one of the respective rotatable elements and at least a scraper that is oriented, relative to the surface of the respective rotatable element, at an angle of between 55° and 65°.

19. The system according to claim 9, wherein at least when the ITM is moved, the processor is configured to control the ICLS to continuously engage between at least the first rotatable element and the second rotatable element.

20. The system according to claim 9, wherein the first rotatable element has a first diameter, and the second rotatable element has a second diameter, equal to the first diameter.

* * * * *